United States Patent
Yasuda et al.

(10) Patent No.: US 10,446,841 B2
(45) Date of Patent: Oct. 15, 2019

(54) ELECTRODE COMPOSITE, SECONDARY BATTERY, BATTERY PACK AND VEHICLE

(71) Applicant: KABUSHIKI KAISHA TOSHIBA, Minato-ku (JP)

(72) Inventors: Kazuhiro Yasuda, Kawasaki (JP); Tomoko Sugizaki, Kawasaki (JP); Kazuomi Yoshima, Yokohama (JP); Takuya Iwasaki, Uenohara (JP); Yasuhiro Harada, Isehara (JP); Norio Takami, Yokohama (JP)

(73) Assignee: KABUSHIKI KAISHA TOSHIBA, Minato-ku (JP)

(*) Notice: Subject to any disclaimer, the term of this patent is extended or adjusted under 35 U.S.C. 154(b) by 197 days.

(21) Appl. No.: 15/692,760

(22) Filed: Aug. 31, 2017

(65) Prior Publication Data
US 2018/0277843 A1 Sep. 27, 2018

(30) Foreign Application Priority Data

Mar. 23, 2017 (JP) .................. 2017-058128

(51) Int. Cl.
*H01M 4/485* (2010.01)
*H01M 2/16* (2006.01)
(Continued)

(52) U.S. Cl.
CPC ......... *H01M 4/485* (2013.01); *H01M 2/1646* (2013.01); *H01M 2/1673* (2013.01); *H01M 2/1686* (2013.01); *H01M 4/131* (2013.01); *H01M 4/385* (2013.01); *H01M 10/0525* (2013.01); *H01M 10/625* (2015.04); *B60L 50/30* (2019.02); *B60L 50/66* (2019.02);
(Continued)

(58) Field of Classification Search
CPC ............. H01M 2/1646; H01M 2/1673; H01M 2/1686; H01M 4/131; H01M 4/385
See application file for complete search history.

(56) References Cited

U.S. PATENT DOCUMENTS

2009/0068563 A1 3/2009 Kanda et al.
2010/0099029 A1 4/2010 Kinoshita et al.
(Continued)

FOREIGN PATENT DOCUMENTS

EP 1 840 987 A1 10/2007
JP 2000-340257 A 12/2000
(Continued)

*Primary Examiner* — Matthew J Merkling
(74) *Attorney, Agent, or Firm* — Oblon, McClelland, Maier & Neustadt, L.L.P.

(57) ABSTRACT

According to one embodiment, an electrode composite is provided. The electrode composite includes a negative electrode active material-containing layer and an insulating particle layer. The negative electrode active material-containing layer includes negative electrode active material secondary particles having an average secondary particle size of from 1 μm to 30 μm. The insulating particle layer is provided on the negative electrode active material-containing layer. The insulating particle layer includes a first surface and a second surface opposed to the first surface. The first surface is in contact with the negative electrode active material-containing layer. The second surface has a surface roughness of 0.1 μm or less.

14 Claims, 9 Drawing Sheets

(51) Int. Cl.
*H01M 4/131* (2010.01)
*H01M 4/38* (2006.01)
*H01M 10/0525* (2010.01)
*H01M 10/625* (2014.01)
*H01M 4/02* (2006.01)
*B60L 50/30* (2019.01)
*B60L 50/60* (2019.01)

(52) U.S. Cl.
CPC ...... *C01P 2002/30* (2013.01); *C01P 2002/32* (2013.01); *H01M 2004/027* (2013.01); *Y02E 60/122* (2013.01); *Y02T 10/7011* (2013.01)

(56) References Cited

U.S. PATENT DOCUMENTS

| | | | | |
|---|---|---|---|---|
| 2011/0159347 | A1* | 6/2011 | Shibano | H01M 2/1646 429/144 |
| 2013/0059192 | A1* | 3/2013 | Kajita | H01M 2/1653 429/143 |
| 2013/0136968 | A1 | 5/2013 | Glanz et al. | |
| 2013/0143128 | A1 | 6/2013 | Mochida et al. | |
| 2013/0224632 | A1* | 8/2013 | Roumi | H01M 2/166 429/516 |
| 2014/0170451 | A1* | 6/2014 | Iwasaki | H01M 2/26 429/90 |
| 2014/0302389 | A1* | 10/2014 | Hasegawa | H01M 2/1646 429/209 |
| 2016/0056468 | A1* | 2/2016 | Miyamoto | H01M 4/13 429/162 |
| 2016/0164108 | A1 | 6/2016 | Matsuno et al. | |
| 2016/0276652 | A1 | 9/2016 | Iwasaki et al. | |

FOREIGN PATENT DOCUMENTS

| | | |
|---|---|---|
| JP | 2002-359010 A | 12/2002 |
| JP | 2006-179205 A | 7/2006 |
| JP | 2006/252882 | 9/2006 |
| JP | 2008-293786 A | 12/2008 |
| JP | 2009-54480 A | 3/2009 |
| JP | 2009/164014 | 7/2009 |
| JP | 2009-245913 A | 10/2009 |
| JP | 2010-97843 A | 4/2010 |
| JP | 2013-515336 A | 5/2013 |
| JP | 2015-35416 A | 2/2015 |
| JP | 2015/176856 | 10/2015 |
| JP | 2015-195183 A | 11/2015 |
| JP | 2016/146359 | 8/2016 |
| JP | 2016-177977 A | 10/2016 |
| JP | 2017-37821 A | 2/2017 |
| WO | 2012/026480 A1 | 3/2012 |
| WO | 2015/147280 A1 | 10/2015 |

* cited by examiner

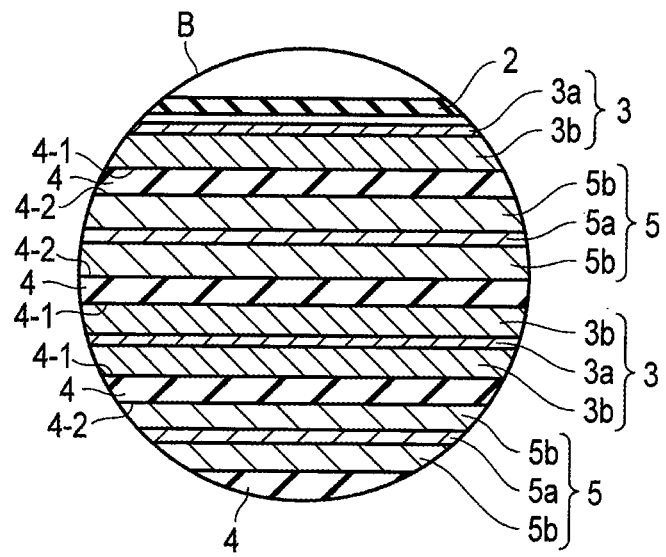
F I G. 5
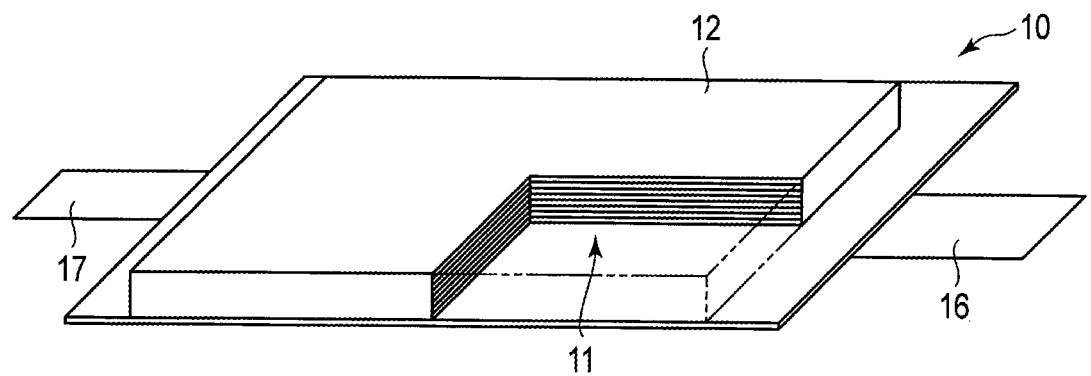
F I G. 6

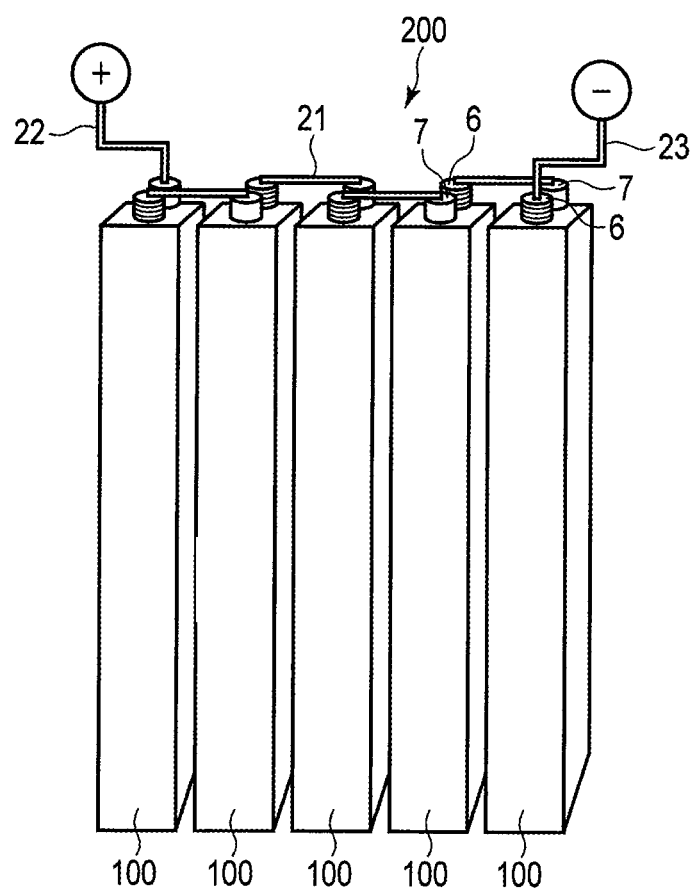
F I G. 10

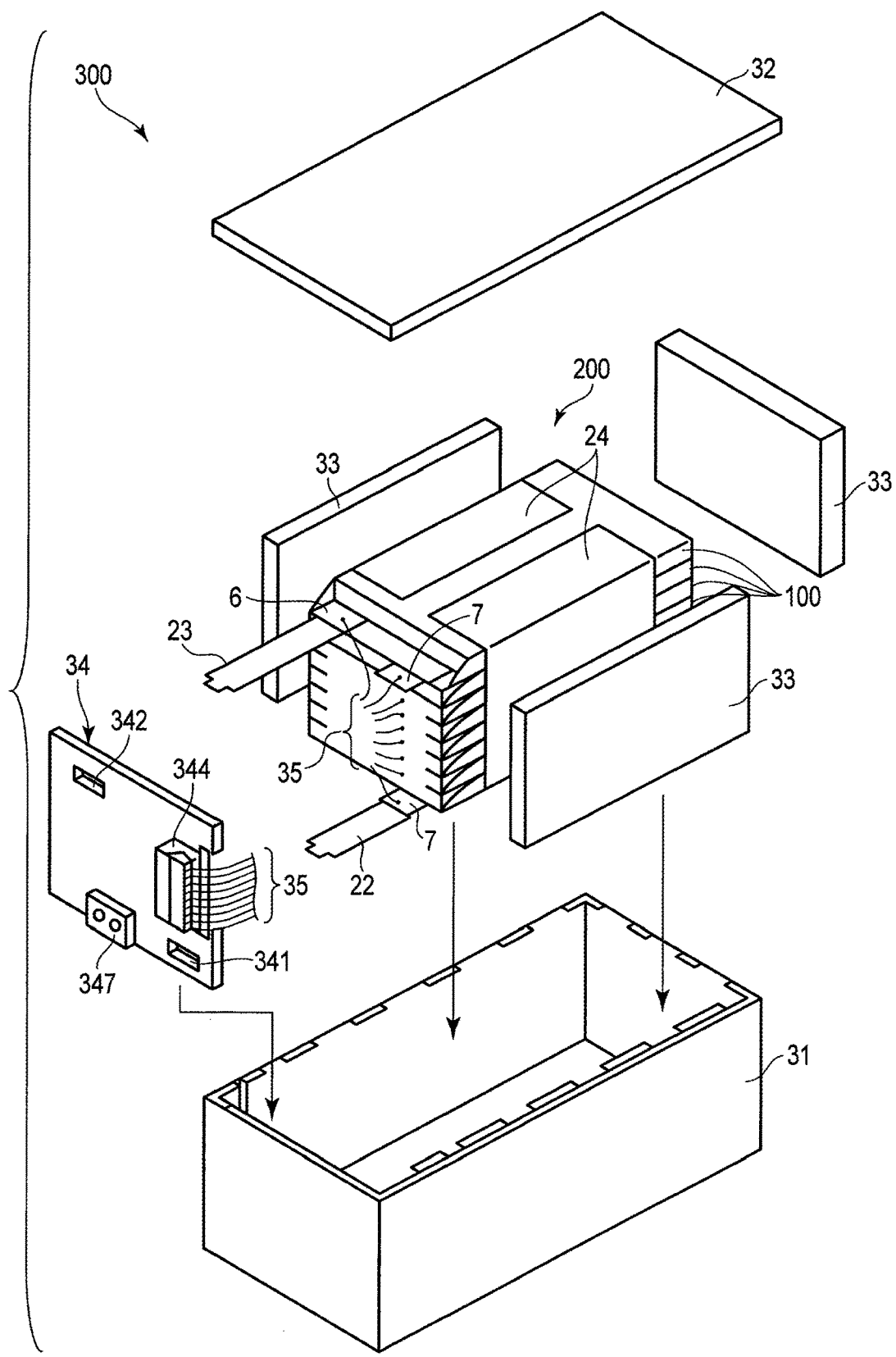
F I G. 11

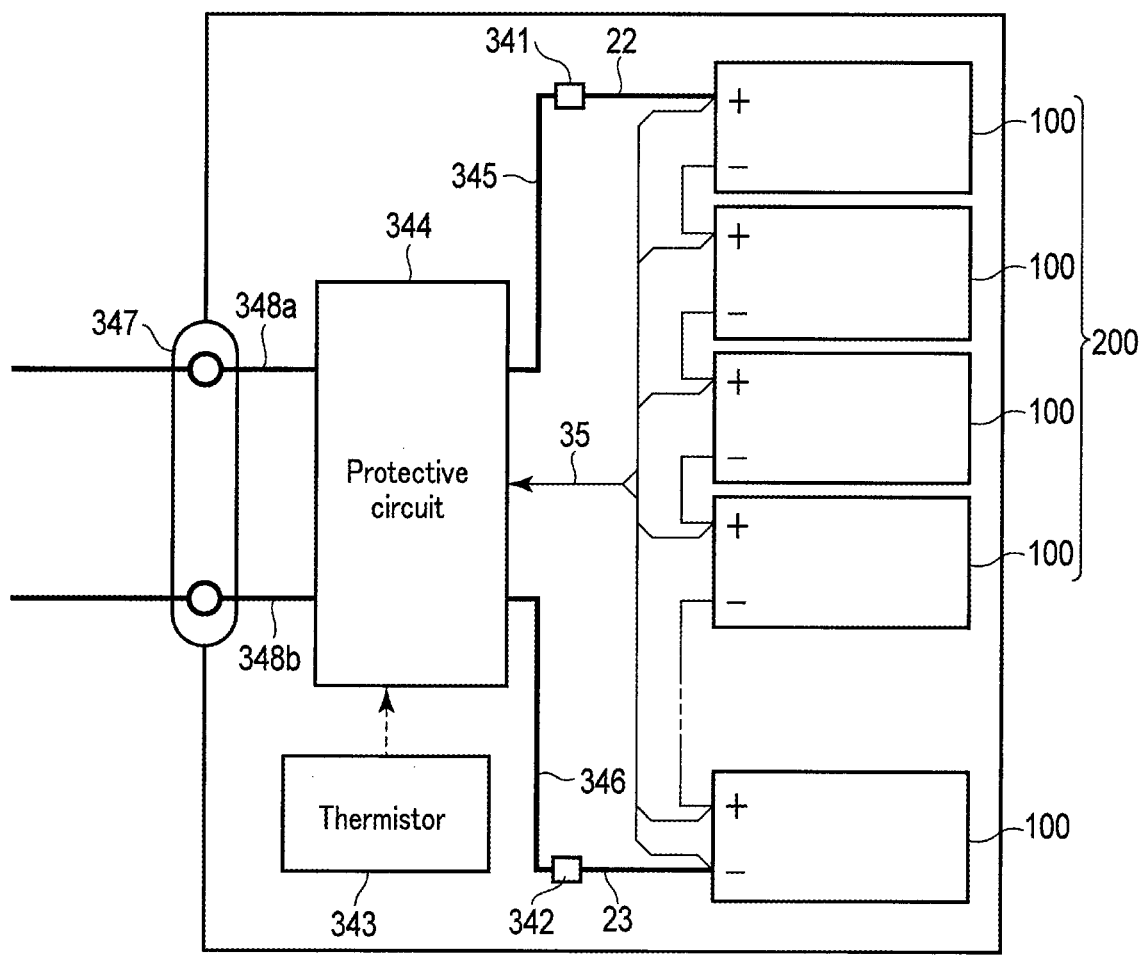
F I G. 12
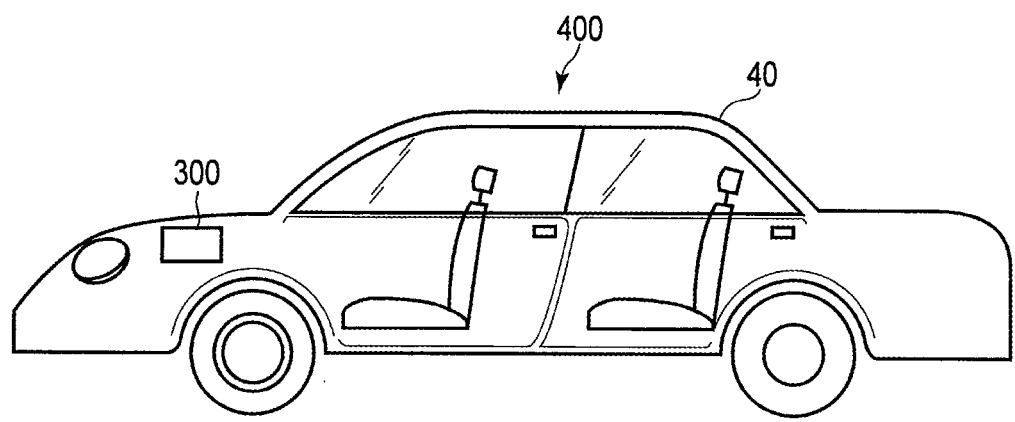
F I G. 13

ELECTRODE COMPOSITE, SECONDARY BATTERY, BATTERY PACK AND VEHICLE

CROSS-REFERENCE TO RELATED APPLICATIONS

This application is based upon and claims the benefit of priority from the Japanese Patent Application No. 2017-058128, filed Mar. 23, 2017, the entire contents of which are incorporated herein by reference.

FIELD

Embodiments described herein relate generally to an electrode composite, a secondary battery, a battery module, a battery pack and a vehicle.

BACKGROUND

In recent years, secondary batteries such as lithium ion secondary batteries have been developed as high-energy density batteries. Secondary batteries are expected as power sources for vehicles such as hybrid automobiles and electric automobiles, and as large-size power sources for electric storage. In particular, for the application for vehicles, secondary batteries are required to have other performance such as rapid charge-and-discharge performance and long-term reliability. Secondary batteries capable of rapid charge and discharge have the advantage of a very short charging time. Furthermore, such a battery can improve performances related to motive force and further efficiently recover a regenerative energy from motive force, in a hybrid vehicle or the like.

The rapid charge and discharge are made possible by rapid movements of electrons and lithium ions between positive electrodes and negative electrodes. However, when a battery using a carbon-based negative electrode is repeatedly subjected to rapid charge-and-discharge, dendrite precipitation of metal lithium may occur on the electrode. These dendrites can cause internal short-circuits, thereby resulting in heat generation and ignition.

Therefore, batteries have been developed which use, as negative electrode active materials, metal composite oxides in place of the carbonaceous materials. In particular, batteries that use titanium-containing oxides as negative electrode active materials are capable of stable rapid charge and discharge, and also exhibit longer lifetimes as compared with carbon-based negative electrodes.

However, such titanium-containing oxides have higher (nobler) potentials with respect to metal lithium as compared with carbonaceous materials. Moreover, the titanium-containing oxides are low in capacity per mass. For these reasons, batteries using these titanium-containing oxides have the problem of being low in energy density.

For example, the operating potential of an electrode including a spinel-type lithium titanate $Li_4Ti_5O_{12}$ is approximately 1.5 V on the basis of metal lithium, and higher (nobler) as compared with the potentials of carbon-based negative electrodes. The potential of the lithium titanate is derived from a redox reaction between $Ti^{3+}$ and $Ti^{4+}$ in the electrochemical insertion and extraction of lithium, and thus electrochemically restricted. In addition, rapid lithium ion charging and discharging can be achieved in a stable manner at a high electrode potential on the order of 1.5 V (vs. $Li/Li^+$). Therefore, it is substantially difficult to lower the potential of the electrode including the lithium titanate in order to improve the energy density.

On the other hand, as for the capacity per unit mass, lithium-titanium composite oxides such as the spinel-type lithium titanate $Li_4Ti_5O_{12}$ have a theoretical capacity of around 175 mAh/g. On the other hand, common carbon-based electrode materials have a theoretical capacity of 372 mAh/g. Accordingly, titanium-containing oxides are significantly lower in capacity density as compared with carbon-based negative electrodes. This is because the crystal structures of the titanium-containing oxides have small numbers of sites in which lithium can be inserted, or lithium is easily stabilized in the structures, thus decreasing the substantial capacity.

BRIEF DESCRIPTION OF THE DRAWINGS

FIG. 5 is an enlarged cross-sectional view of a portion B of the secondary battery shown in FIG. 4;

FIG. 6 is a partially cutaway perspective view schematically showing a second example of a secondary battery according to the second embodiment;

FIG. 10 is a perspective view schematically showing one example of a battery module according to a third embodiment;

FIG. 11 is an exploded perspective view schematically showing one example of a battery pack according to a fourth embodiment;

FIG. 12 is a block diagram showing an electric circuit of the battery pack in FIG. 11;

FIG. 13 is a schematic sectional view showing one example of a vehicle according to a fifth embodiment.

DETAILED DESCRIPTION

Figure 1:
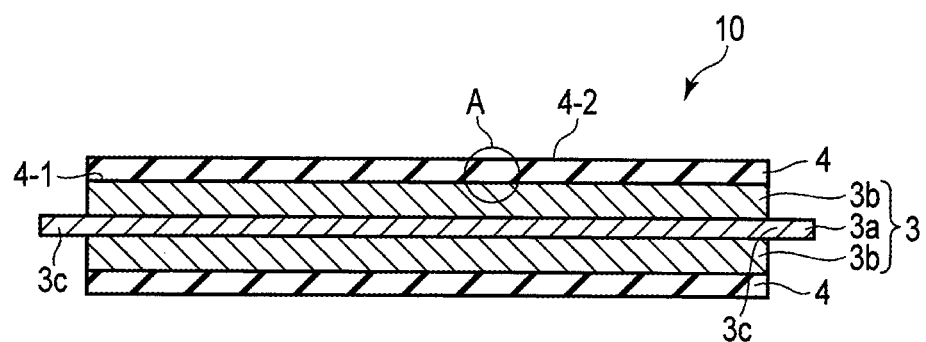
FIG. 1 is a schematic cross-sectional view of a first example of an electrode composite according to a first embodiment.

In general, according to an embodiment, an electrode composite is provided. The electrode composite includes a negative electrode active material-containing layer and an insulating particle layer. The negative electrode active material-containing layer includes negative electrode active material secondary particles. An average secondary particle size of the negative electrode active material secondary particles is from 1 μm to 30 μm. The insulating particle layer includes inorganic compound particles. The insulating particle layer is provided on the negative electrode active material-containing layer. The insulating particle layer includes a first surface and a second surface opposed to the first surface. The first surface is in contact with the negative electrode active material-containing layer. A surface roughness of the second surface of the insulating particle layer is 0.1 µm or less.

According to an embodiment, a secondary battery is provided. The secondary battery includes the electrode composite according to the embodiment, and a positive electrode. The positive electrode includes a positive electrode active material-containing layer. The second surface of the insulating particle layer of the electrode composite is in contact with the positive electrode active material-containing layer.

According to an embodiment, a battery module is provided. The battery module includes the secondary batteries each according to the embodiment.

According to an embodiment, a battery pack is provided. The battery pack includes the secondary battery according to the embodiment.

According to an embodiment, a vehicle is provided. The vehicle includes the battery pack according to the embodiment.

The embodiments will be explained below with reference to the drawings. In this case, the structures common to all embodiments are represented by the same symbols and duplicated explanations will be omitted. Also, each drawing is a typical view for explaining the embodiments and for promoting an understanding of the embodiments. Though there are parts different from an actual device in shape, dimension and ratio, these structural designs may be properly changed taking the following explanations and known technologies into consideration.

First Embodiment

According to a first embodiment, an electrode composite is provided. The electrode composite includes a negative electrode active material-containing layer and an insulating particle layer. The negative electrode active material-containing layer includes negative electrode active material secondary particles. An average secondary particle size of the negative electrode active material secondary particles is from 1 µm to 30 µm. The insulating particle layer includes inorganic compound particles. The insulating particle layer is provided on the negative electrode active material-containing layer. The insulating particle layer includes a first surface and a second surface opposed to the first surface. The first surface is in contact with the negative electrode active material-containing layer. A surface roughness of the second surface of the insulating particle layer is 0.1 µm or less.

"Average secondary particle size" described below is the volume average secondary particle size. "Average primary particle size" is the volume average primary particle size. "Average particle size" of a mixture of primary particles and secondary particles is the volume average particle size of the mixture without distinction between primary particles and secondary particles.

The negative electrode active material-containing layer included in the electrode composite according to the first embodiment includes the negative electrode active material secondary particles. The negative electrode active material secondary particles may be, for example, agglomerates of negative electrode active material primary particles. The negative electrode active material secondary particles may be, for example, one obtained by granulating the negative electrode active material primary particles with a binder or the like. Alternatively, the negative electrode active material secondary particles may be agglomerates of the negative electrode active material primary particles due to interaction or the like. Such a negative electrode active material secondary particle can have a smaller specific surface area than the negative electrode active material primary particle. Thus, in the secondary battery that can be realized by using the electrode composite according to the first embodiment, it is possible to suppress side reactions between an electrolyte, for example a nonaqueous electrolyte, and the negative electrode active material secondary particles at a surface of the negative electrode active material-containing layer. In addition, the negative electrode active material secondary particles can improve the ease of handling at the time of manufacturing an electrode. Further, by using the negative electrode active material secondary particles, it is possible to improve an electrode density and to expect realization of a secondary battery capable of exhibiting a high energy density.

The present inventors have repeatedly performed trial manufacture in each of which an insulating particle layer was provided on a negative electrode active material-containing layer including such negative electrode active material secondary particles to obtain an electrode composite, and the electrode composite was used to manufacture a secondary battery. As a result, the present inventors have found that the secondary batteries actually produced by way of trial were poor in output performance.

As a result of detailed analysis of this result, the present inventors have found that in the prototype secondary battery, an electrical short circuit partially occurs between the positive electrode and the negative electrode. As a result of searching for the cause of the electrical short circuit, it was found that the thickness of the insulating particle layer located between a negative electrode active material-containing layer and the positive electrode (positive electrode active material containing-layer) is not uniform, and there is a portion in which a distance between the negative electrode active material-containing layer and the positive electrode is remarkably small, and a physical contact between the positive electrode and the negative electrode occurs at the portion. It was further found that the reason why the thickness of the insulating particle layer is not uniform is that surface roughness of a surface of the insulating particle layer in contact with the positive electrode is large, reflecting the particle size of the negative electrode active material secondary particle.

As a result of intensive studies based on this result, the present inventors have realized the electrode composite according to the first embodiment.

The electrode composite according to the first embodiment includes a negative electrode active material-containing layer and an insulating particle layer provided on the negative electrode active material-containing layer. The insulating particle layer has a first surface and a second surface opposed to the first surface. That is, the second surface can be referred as a reverse surface relative to the first surface. The first surface is in contact with the negative electrode active material-containing layer. The second surface of the insulating particle layer can also be referred to as the surface of the electrode composite. The second surface of the insulating particle layer can be in contact with the positive electrode in the secondary battery.

In the electrode composite according to the first embodiment, although the average secondary particle size of the negative electrode active material secondary particles included in the negative electrode active material-containing layer is from 1 µm to 30 µm, the surface roughness of the second surface of the insulating particle layer formed thereon is 0.1 μm or less. The insulating particle layer in which the surface roughness of the second surface is within this range can have a more uniform thickness. In the secondary battery produced using the electrode composite according to the first embodiment, such an insulating particle layer can prevent a physical contact between the negative electrode active material-containing layer and the positive electrode (for example, the positive electrode active material-containing layer).

In such a secondary battery, since the negative electrode active material-containing layer includes the negative electrode active material secondary particles having an average secondary particle size of from 1 μm to 30 μm, side reactions between the negative electrode active material secondary particles and the electrolyte can be suppressed due to the above-described reason.

Electrical short circuit and side reactions between the negative electrode active material secondary particles and the electrolyte are factors that lower the output performance of the secondary battery. Since the electrode composite according to the first embodiment can suppress these factors, a secondary battery capable of exhibiting an excellent output performance can be realized.

Next, an electrode structure according to the first embodiment will be described in more detail.

The electrode composite according to the first embodiment includes a negative electrode active material-containing layer and an insulating particle layer provided on the negative electrode active material-containing layer.

The electrode composite according to the first embodiment may include a negative electrode including the negative electrode active material-containing layer, or an electrode having a bipolar structure which includes the negative electrode active material-containing layer and a positive electrode active material-containing layer.

The negative electrode may further include a negative electrode current collector. The negative electrode current collector can have a belt-like planar shape having, for example, one surface and the other surface as an opposing surface thereof (a reverse surface relative to the one surface). The negative electrode active material-containing layer may be provided on the both surfaces of the negative electrode current collector, or may be provided on one of the surfaces. The negative electrode current collector may include a portion not supporting the negative electrode active material-containing layer on any surface. This portion can serve as a negative electrode tab, for example.

The electrode having the bipolar structure may further include a current collector. The current collector can have a belt-like planar shape having two surfaces, for example, a third surface and a fourth surface opposed to the third surface. That is, the fourth surface is a reverse surface relative to the third surface. The negative electrode active material-containing layer can be provided on the third surface of the current collector. The positive electrode active material-containing layer can be provided on the fourth surface of the current collector. The current collector may include a portion not supporting the active material-containing layer (the negative electrode active material-containing layer or the positive electrode active material-containing layer) on any surface. This portion can serve as an electrode tab, for example.

The negative electrode active material-containing layer includes negative electrode active material secondary particles. The negative electrode active material-containing layer may further include negative electrode active material primary particles.

The average secondary particle size of the negative electrode active material secondary particles is from 1 μm to 30 μm.

The negative electrode active material secondary particles having an average secondary particle size of less than 1 μm has a too large specific surface area. Such negative electrode active material secondary particles tend to cause side reactions with the electrolyte in the secondary battery, and as a result, the output performance of the secondary battery deteriorates. On the other hand, in the negative electrode active material-containing layer including the negative electrode active material secondary particles having an average secondary particle size of more than 30 μm, surface roughness of a coated film becomes too large, for example, when the film is formed by coating. It is difficult for this coated film to form a negative electrode active material-containing layer having a small surface roughness even if the film is subjected to treatment such as pressing. In particular, for the purpose of high output, a negative electrode active material-containing layer with a small thickness may be produced. In such a case, a coated film including the negative electrode active material secondary particles having an average secondary particle size of more than 30 μm is to be subjected to a pressing step or the like with a large pressing pressure; however, due to these processes, a trouble such as disintegrating of secondary particles is likely to occur.

The average secondary particle size of the negative electrode active material secondary particles is preferably from 5 μm to 15 μm. If such preferred negative electrode active material secondary particles are used, even when a coated film including these particles is pressed at a relatively high pressure for the purpose of high output, while preventing disintegrating of secondary particles, a negative electrode active material-containing layer having a small surface roughness can be produced. The average secondary particle size of the negative electrode active material secondary particles is more preferably from 8 μm to 15 μm.

When the negative electrode active material-containing layer includes the negative electrode active material primary particles, the average primary particle size of the primary particles is preferably from 0.1 μm to 10 μm, and more preferably from 1 μm to 5 μm. For the primary particles constituting the secondary particles as well, the average primary particle size of the primary particles is preferably from 0.1 μm to 10 μm, and more preferably from 1 μm to 5 μm. It is desirable that the average primary particle size of the primary particles is within this range, because handling during production of secondary particles and loss in the same process can be suppressed.

A BET specific surface area of the negative electrode active material secondary particles is preferably from 5 $m^2/g$ to 100 $m^2/g$. Considering handling of active materials and a mixing property with a conductive agent and a binder, the BET specific surface area of the negative electrode active material secondary particle is more preferably from 5 $m^2/g$ to 20 $m^2/g$.

The negative electrode active material-containing layer may further include a conductive agent and a binder. The conductive agent may be, for example, conductive agent particles.

A surface of the negative electrode active material-containing layer in contact with the first surface of the insulating particle layer may have a recess. This recess may be, for example, a gap between the negative electrode active material secondary particles exposed on a surface of the negative electrode active material-containing layer, a gap between conductive agent particles exposed on a surface of the negative electrode active material-containing layer, and/or a gap between a negative electrode active material secondary particle and a conductive agent particle which are exposed on a surface of the negative electrode active material-containing layer.

The positive electrode active material-containing layer can include, for example, positive electrode active material particles, a conductive agent, and a binder.

The insulating particle layer has a first surface and a second surface opposed to the first surface. The first surface is in contact with the negative electrode active material-containing layer.

The surface roughness of the second surface of the insulating particle layer is 0.1 µm or less. The surface roughness of the second surface is, for example, from 0.05 µm to 0.1 µm. The surface roughness of the second surface is preferably from 0.05 µm to 0.08 µm. Within this range, the probability of short circuit can be decreased and the electrolyte can be sufficiently filled, so that a more excellent output performance can be realized.

It is preferable that the surface roughness of the first surface of the insulating particle layer, that is, the surface in contact with the negative electrode active material-containing layer is 5 µm or less. Since the insulating particle layer in which the surface roughness of the first surface is within this range can have a more uniform thickness, more excellent output performance can be realized. The surface roughness of the first surface is more preferably from 0.5 µm or more and 5 µm. The insulating particle layer in which the surface roughness of the first surface is from 0.5 µm to 5 µm can take a state in which the insulating particle layer can cover the surface of the negative electrode active material-containing layer while insulating particles included in the insulating particle layer sufficiently enter into the recess that can exist on the surface of the negative electrode active material-containing layer. Such an insulating particle layer can achieve more excellent electrical insulation between the negative electrode active material-containing layer and the positive electrode (for example, the positive electrode active material-containing layer), and electrical short circuit therebetween can be more sufficiently suppressed.

The thickness of the insulating particle layer is preferably from 10 µm to 40 µm. Among the electrode composites according to the first embodiment, an electrode composite including an insulating particle layer having a thickness within the preferred range can sufficiently suppress electrical short circuit between the negative electrode active material-containing layer and the positive electrode (for example, a positive electrode active material-containing layer) while suppressing a resistance value. The thickness of the insulating particle layer is more preferably from 10 µm to 30 µm.

The insulating particle layer includes inorganic compound particles. The inorganic compound particles preferably include particles of a lithium ion-conductive substance (lithium ion-conductive particles). The inorganic compound particles may consist of particles of a lithium ion conductive substance.

The inorganic compound particles can include, for example, particles of a first group having a first average particle size and particles of a second group having a second average particle size larger than the first average particle size. The first surface of the insulating particle layer preferably includes at least a portion of the particles of the first group. In this preferred aspect, the inorganic compound particles of the first group can fill the previously-described recesses on the surface of the negative electrode active material-containing layer. It is preferable that the inorganic compound particles of the second group are present in a portion closer to the second surface of the insulating particle layer relative to the inorganic compound particles of the first group. In this preferred aspect, since the insulating particle layer includes the inorganic compound particles of the second group, which have a large particle size, a sufficient space capable of holding, for example, a liquid nonaqueous electrolyte and/or a gel nonaqueous electrolyte can be provided.

The first average particle size is preferably from 0.01 µm to 10 µm and more preferably from 0.05 µm to 3 µm. The second average particle size is preferably from 15 µm to 30 µm and more preferably from 15 µm to 25 µm.

The inorganic compound particles of the first group preferably have a particle size d10 of 30% or less of the average particle size and a particle size d90 of 1.5 times or less the average particle size. Similarly, the inorganic compound particles of the second group preferably have a particle size d10 of 30% or less of the average particle size and a particle size d90 of 1.5 times or less the average particle size. Here, the particle size d10 is the particle size at which a cumulative frequency from a small particle size side is 10% in a cumulative particle size curve of the particles. The particle size d90 is the particle size at which the cumulative frequency from the small particle size side is 90% in the cumulative particle size curve of the particles.

The insulating particle layer may includes a binder, for example.

Materials which can be used in an electrode composite according to the first embodiment will be described below in detail.

(1) Negative Electrode

The negative electrode current collector is preferably aluminum foil, or aluminum alloy foil containing at least one element selected from Mg, Ti, Zn, Mn, Fe, Cu, and Si. The average crystal particle size of the aluminum foil and the aluminum alloy foil is preferably 50 µm or less. This results in allowing the current collector to exhibit dramatically-improved strength and the negative electrode to undergo an increase in density at high pressing pressure, and thus allowing the battery capacity to be increased. Moreover, the deterioration of the negative electrode current collector due to melting or corrosion by over-discharge cycle under a high-temperature (40° C. or more) environment can be prevented. Therefore, an increase in impedance of the negative electrode can be suppressed. Furthermore, output characteristics, rapid-charge characteristics, charge-and-discharge cycle characteristics can be also improved. The average crystal particle size of the negative electrode current collector is more preferably 30 µm or less, further preferably 5 µm or less.

The foregoing average crystal particle sizes of the aluminum foil and aluminum alloy foil is affected complexly by many factors such as material structure, impurities, processing conditions, heat treatment histerisis, and annealing conditions. The crystal particle size (diameter) of the aluminium foil or aluminium alloy foil can be adjusted to 50 µm or less by combining the previously mentioned factors in the manufacturing process.

The average crystal particle size is obtained as follows. The surface texture of the current collector is subjected to texture observation with an optical microscope, thereby finding the number n of crystal particles present in 1 mm×1 mm. The average crystal particle area S is obtained from $S=1\times10^6/n$ (µm$^2$) with the use of the number n. From the obtained value of S, the average crystal particle size d (µm) is calculated in accordance with the following formula (A).

$$d=2(S/\pi)^{1/2} \quad (A)$$

The aluminum foil and the aluminum alloy foil are, for example, 20 μm or less, more preferably 15 μm in thickness. The aluminum foil preferably has a purity of 99% by mass or more. An alloy containing an element such as magnesium, zinc, and silicon is preferred as the aluminum alloy. On the other hand, the content of a transition metal such as iron, copper, nickel, and chromium is preferably 1% by mass or less.

The negative electrode active material secondary particles preferably include titanium-containing oxide particles. The titanium-containing oxide particles are not particularly limited as long as the particles can have lithium inserted and extracted. For example, a titanium-niobium composite oxide, a lithium titanate having a spinel-type crystal structure, a lithium titanate having a ramsdellite-type crystal structure, other titanium-containing metal composite oxides, a titanium dioxide having a monoclinic crystal structure ($TiO_2$ (B)), and a titanium dioxides having an anatase-type crystal structure can be used. That is, the titanium-containing oxide particle can include, for example, at least one kind of particles selected from the group consisting of particles of the lithium titanate having the spinel-type crystal structure, particles of the lithium titanate having the ramsdellite-type crystal structure, particles of the titanium-niobium composite oxide, particles of the titanium dioxide having the monoclinic crystal structure, and particles of titanium dioxide having the anatase-type crystal structure.

The titanium-niobium composite oxide can include, for example, a group of compounds represented by a general formula of $Li_xTi_{1-y}M1_yNb_{2-z}M2_zO_7$. Here, x is a value varying within a range of $0 \leq x \leq 5$, depending on charge-and-discharge reactions. In addition, M1 may be at least one selected from the group consisting of Zr, Si and Sn. M2 may be at least one selected from the group consisting of V, Ta, and Bi. y is a value that satisfies $0 \leq y < 1$. z is a value that satisfies $0 \leq z \leq 2$. M1 may be one selected from the group consisting of Zr, Si and Sn, include two selected from the group consisting of Zr, Si and Sn, or include Zr, Si and Sn. Similarly, M2 may be one selected from the group consisting of V, Ta, and Bi, include two selected from the group consisting of V, Ta, and Bi, or include V, Ta, and Bi.

Preferable examples of the titanium-niobium composite oxide include $Nb_2TiO_7$, $Nb_2Ti_2O_9$, $Nb_{10}Ti_2O_9$, $Nb_{24}TiO_{64}$, $Nb_{14}TiO_{37}$, and $Nb_2TiO_9$. These composite oxides may be substituted titanium-niobium composite oxides in which at least a part of Nb and/or Ti is substituted by other element(s). Examples of substituting element (other element) include V, Cr, Mo, Ta, Zr, Mn, Fe, Mg, B, Pb and Al. Substituting element may be one element, or may be a combination of two or more of these.

The negative electrode active material secondary particles can include one kind of particles of titanium-niobium composite oxide or can include particles of plural kinds of titanium-niobium composite oxides. In particular, it is preferable that the negative electrode active material secondary particles include particles of a titanium composite oxide having a monoclinic crystal structure (for example, having a composition represented by $Nb_2TiO_7$). In particular, the active material particles including the titanium-niobium composite oxide can include secondary particles as agglomerates of primary particles. The active material particles preferably include the secondary particles and a carbon-containing layer, for example, carbon coating, covering at least a portion of the surface of the secondary particles. The carbon-containing layer may cover a surface of each primary particle or may cover the surface of the secondary particle. Since an electrode using an active material particle containing the carbon-containing layer has improved electron conductivity, a large current easily flows. In addition, the carbon-containing layer covering at least a portion of the surface of the active material can suppress overvoltage generated when charge and discharge are repeated. As a result, an excellent cycle life can be realized.

As the lithium titanate having the spinel-type crystal structure, a compound represented by a general formula of $Li_{4+x}Ti_5O_{12}$, wherein x varies within a range of $-1 \leq x \leq 3$ depending on the charge-and-discharge reactions, and the like can be cited. As the lithium titanate having the ramsdellite-type crystal structure, a compound represented by a general formula of $Li_{2+y}Ti_3O_7$, wherein y varies within a range of $-1 \leq y \leq 3$ depending on the charge-and-discharge reactions, and the like can be cited. $TiO_2$ (B) and the anatase-type titanium dioxide can further include Li due to charging. Therefore, these titanium dioxide can have a composition represented by, for example, $Li_{1+z}TiO_2$, wherein z varies within a range of $-1 \leq z \leq 0$, depending on the charge-and-discharge reactions.

Examples of the other titanium-containing metal composite oxides include metal composite oxides including Ti and at least one element selected from the group consisting of P, V, Sn, Cu, Ni, and Fe. Examples of such a metal composite oxide include $TiO_2$—$P_2O_5$, $TiO_2$—$V_2O_5$, $TiO_2$—$P_2O_5$—$SnO_2$, and $TiO_2$—$P_2O_5$-MeO (Me is at least one element selected from the group consisting of Cu, Ni, and Fe).

Such a metal composite oxide preferably has low crystallinity, and have a microstructure where a crystal phase coexists with an amorphous phase, or a microstructure where an amorphous phase exist alone. Due to having the microstructure, a cycle performance can be substantially improved.

The negative electrode active material secondary particles may consist of titanium-containing oxide particles, be a mixture of titanium-containing oxide particles and particles of a negative electrode active material other than the titanium-containing oxide, or consist of particles of a negative electrode active material other than titanium-containing oxide. However, a mass ratio of titanium-containing oxide particles to total amount of the negative electrode active material secondary particles is preferably 50% by mass or more.

As a negative electrode active material other than titanium-containing oxide, a compound that allows lithium ions to be inserted therein and extracted therefrom can be used. Examples of the compounds include oxides (composite oxides), sulfides, and nitrides. These compounds also include metal compounds that include no lithium in uncharged states, but come to include lithium through charging.

Such oxides include amorphous tin oxides such as, for example, $SnB_{0.4}P_{0.6}O_{3.1}$, tin-silicon oxides such as, for example, $SnSiO_3$, silicon oxides such as, for example, SiO, and tungsten oxides such as, for example, $WO_3$.

As further negative electrode active material, a niobium-containing oxide can be cited. Examples of the niobium-containing oxide include a niobium oxide (for example $Nb_2O_5$), and a niobium-titanium composite oxide having a monoclinic crystal structure (for example $Nb_2TiO_7$) that exhibits a lithium insertion and extraction potential of nobler than 1.0 V with respect to the potential of metal lithium.

Other examples of the oxide include the composite oxides having an orthorhombic crystal structure and a composition represented by a following general formula (1) or (2):

$$Li_aM1_{1-b}M2_bTi_{6-c}M3_cO_{14+d} \quad (1),$$

wherein M1 is at least one selected from the group consisting of Sr, Ba, Ca, and Mg; M2 is at least one selected from the group consisting of Cs, K, and Na; M3 is at least one selected from the group consisting of Al, Fe, Zr, Sn, V, Nb, Ta, and Mo; the subscripts are within the range of 2≤a≤6, 0<b<1, 0<c≤6, and −0.5≤d≤0.5; M1 may include one selected from the group consisting of Sr, Ba, Ca, and Mg, or a combination of two or more selected from this group; M2 may include one selected from the group consisting of Cs, K, and Na, or a combination of two or more selected from this group; M3 may include one selected from the group consisting of Al, Fe, Zr, Sn, V, Nb, Ta, and Mo, or a combination of two or more selected from this group;

$$Li_{2+w}Na_{2-e}M\alpha_f Ti_{6-g}M\beta_g O_{14+h} \quad (2)$$

wherein Mα is at least one selected from the group consisting of Cs and K; Mβ is at least one selected from the group consisting of Zr, Sn, V, Nb, Ta, Mo, W, Fe, Co, Mn, and Al; the subscriptions are within the range of 0≤w≤4, 0<e<2, 0≤f<2, 0<g≤6, and −0.5≤h≤0.5; Mα may be one of Cs and K, or may include both of Cs and K; Mβ may include one selected from the group consisting of Zr, Sn, V, Nb, Ta, Mo, W, Fe, Co, Mn, and Al, or a combination of two or more selected from the group consisting of Zr, Sn, V, Nb, Ta, Mo, W, Fe, Co, Mn, and Al.

The composite oxide represented by the general formula (1) or (2) preferably includes Nb. The preferred composite oxide may be referred to as a niobium-containing composite oxide having an orthorhombic crystal structure.

These composite oxides exhibit a small volume change due to insertion and extraction of lithium. In addition, these composite oxides exhibit a lower operating potential than the lithium titanate having the spinel-type structure. Therefore, the secondary battery including an electrode including any of these composite oxides as a negative electrode can exhibit a higher battery voltage than a secondary battery including the lithium titanate having the spinel-type structure as a negative electrode. In addition, these composite oxides exhibit a charge curve and a discharge curve in each of which the potential changes with a significant gradient without the step of the potential in the operating potential range. Therefore, in the secondary battery including any of these composite oxides, the state-of-charge can be easily grasped based on the voltage change.

The niobium-containing composite oxide having the orthorhombic crystal structure more preferably further includes Na.

Should be noted that the composite oxide represented by the general formula (1) or (2) include a composite oxide including Nb and Ti. As a specific example, there can be cited a composite oxide represented by the general formula (1), wherein the subscription c is within a range of 0<c<6 and M3 is Nb or a combination of Nb and at least one selected from the group consisting of Al, Fe, Zr, Sn, V, Ta, and Mo. As another specific example, there can be cited a composite oxide represented by the general formula (2), wherein the subscription g is within a range of 0<g<6 and Mβ is Nb or a combination of Nb and at least one selected from the group consisting of Zr, Sn, V, Ta, Mo, Fe, Co, Mn, and Al. Each of these composite oxides can be also referred to as a titanium-nibium-containing composite oxide having an orthorhombic crystal structure. These composite oxides is also included in the titanium-containing oxides, and is further included in the titanium-niobium composite oxides.

Examples of the sulfides include a titanium sulfide such as $TiS_2$, a molybdenum sulfide such as $MoS_2$, an iron sulfide, such as FeS, $FeS_2$, and $Li_xFeS_2$.

Example of the nitrides include a lithium cobalt nitride (for example, $Li_xCo_yN$, 0<x<4, 0<y<0.5).

The conductive agent is added, if necessary, in order to enhance the current-collecting performance, and reduce the contact resistance between the active material and the current collector. Examples of the conductive agent include carbonaceous substances such as acetylene black, Ketjen black, graphite and/or coke.

As the binder, for example, polytetrafluoroethylene (PTFE), polyvinylidene fluoride (PVdF), a cellulose-containing component such as sodium carboxymethyl cellulose (CMC), a fluorine-containing rubber or a styrene-butadiene rubber can be, without limitation thereto, used.

The negative electrode active material, the conductive agent, and the binder are preferably blended respectively in proportions of: 80% by mass to 98% by mass; 0% by mass to 20% by mass; and 2% by mass to 7% by mass. The amount of the binder, adjusted to 2% by mass or more, provides a sufficient binding property between the negative electrode active material-containing layer and the negative electrode current collector, thereby achieving highly cycle characteristics. On the other hand, from the perspective of increasing the capacity, the amount of the conductive agent is preferably 20% by mass or less, and the amount of the binder is preferably 7% by mass or less.

A density of the negative electrode active material-containing layer is preferably from 1.8 g/cm³ to 2.5 g/cm³.

In addition, the negative electrode active material-containing layer can also include a substance that emits fluorescence during exposure to ultraviolet rays. For example, such a fluorescent substance can be included in a negative electrode slurry to be applied to the negative electrode current collector. The fluorescent substance can be mixed with a negative electrode slurry in an amount of from 1% by mass to 3% by mass relative to a mass of the negative electrode active material.

Examples of the fluorescent substance include potassium halo-phosphate doped with Sb and Mn, ZnS doped with Ag, $Zn_2SiO_4$ doped with Mn, and ZnCdS doped with Ag.

(2) Electrode Having Bipolar Structure

As a current collector that can be included in an electrode having the bipolar structure, a current collector which can be used as a negative electrode current collector described above can be used.

As materials of the negative electrode active material-containing layer included in the electrode having the bipolar structure, the same materials as those of the negative electrode active material-containing layer included in the negative electrode described above can be used.

The positive electrode active material-containing layer can include a positive electrode active material, a conductive agent and a binder, as described above.

Examples of the positive electrode active material include an oxide, a composite oxide and polymer each of which allow lithium ions to be inserted therein and extracted therefrom.

Examples of the oxide and composite oxide include a manganese dioxide ($MnO_2$), an iron oxide, a copper oxide, a nickel oxide, a lithium-manganese composite oxide (for example, $Li_xMn_{2-y}M_yO_4$ or $Li_xMn_{1-y}M_yO_2$), a lithium-nickel composite oxide (for example, $Li_xNi_{1-x}M_yO_2$), a lithium-cobalt composite oxide ($Li_xCo_{1-y}M_yO_2$), a lithium-nickel-cobalt composite oxide (for example, $Li_xNi_{1-y-z}Co_yM_zO_2$), a lithium phosphate compound having a olivine-type crystal structure (for example, $Li_xFePO_4$, $Li_xFe_{1-y}M_yPO_4$, $Li_xCoPO_4$ and the like), a lithium-manganese-cobalt composite oxide (for example, $Li_xMn_{1-y-z}Co_yM_zO_2$), a lithium-manganese-nickel composite oxide (for example, $Li_xMn_aNi_bM_cO_2$ (a+b+c=1), for example, $Li_xMn_{1/2}Ni_{1/2}O_2$), a lithium-manganese-nickel composite oxide having a spinel-type crystal structure ($Li_xMn_{2-y}Ni_yO_4$), a lithium-nickel-cobalt-manganese composite oxide (for example, $Li_xMn_{1/3}Ni_{1/3}Co_{1/3}O_2$), an iron sulfate ($Fe_2(SO_4)_3$), and a vanadium oxide (for example, $V_2O_5$). As the positive electrode active material, these compounds may be used singly, or two or more compounds may be used in combination.

Should be noted that when the compounds mentioned above are not particularly defined, x, y, and z preferably fall respectively within the ranges of 0 to 1.2, 0 to 0.5, and 0 to 0.1. In addition, M represents at least one element selected from the group consisting of Co, Mn, Ni, Al, Cr, Fe, Mg, Zn, Zr, Sn, Cu, and Fe. Here, M may be one element selected from the group consisting of Co, Mn, Ni, Al, Cr, Fe, Mg, Zn, Zr, Sn, Cu, and Fe. Alternatively, M may be a combination of two or more elements selected from the group consisting of Co, Mn, Ni, Al, Cr, Fe, Mg, Zn, Zr, Sn, Cu, and Fe.

The positive electrode active material preferably includes at least one selected from the group consisting of the lithium phosphate compound having the olivine-type crystal structure, the lithium-manganese composite oxide, the lithium-nickel composite oxide, the lithium-cobalt composite oxide, the lithium-nickel-cobalt composite oxide, the lithium-manganese-nickel composite oxide, the lithium-manganese-nickel composite oxide having the spinel-type crystal structure, and the lithium-manganese-cobalt composite oxide. The use of the described-above compounds as the positive electrode active materials can achieve a high battery voltage.

As the polymer, for example, conductive polymer materials such as polyaniline and polypyrrole, or disulfide polymer materials may be used. Sulfur (S) or fluorocarbon can be also used as the active material.

The positive active material has, for example, in a particle shape. Particles may be primary particles or secondary particles as agglomerates of primary particles.

The positive electrode active material preferably has a BET specific surface area of 0.1 $m^2/g$ to 10 $m^2/g$. The positive electrode active material particles with a specific surface area of 0.1 $m^2/g$ or more can sufficiently ensure insertion and extraction sites for lithium ions. The positive electrode active material particles with a specific surface area of 10 $m^2/g$ or less is easily handled for industrial production, and can ensure favorable charge-and-discharge cycle performance. The method for measuring the BET specific surface area will be described later.

The conductive agent is added, if necessary, in order to enhance the current-collecting performance, and reduce the contact resistance between the active material and the current collector. Examples of the conductive agent include carbonaceous substances such as acetylene black, Ketjen black, graphite and/or coke.

As the binder, for example, polytetrafluoroethylene (PTFE), polyvinylidene fluoride (PVdF), a cellulose-containing component, for example, sodium carboxymethyl cellulose (CMC), a fluorine-containing rubber or a styrene-butadiene rubber can be, without limitation thereto, used.

The positive electrode active material, the conductive agent, and the binder are preferably blended respectively in proportions of: 73% by mass to 95% by mass; 3% by mass to 20% by mass; and 2% by mass to 7% by mass. The amount of the conductive agent is adjusted to 3% by mass or more, thereby making it possible to achieve the effect described above. The amount of the conductive agent, adjusted to 20% by mass or less, can reduce the decomposition of the nonaqueous electrolyte at the surface of the conductive agent under high-temperature storage. The amount of the binder is adjusted to 2% by mass or more, thereby providing sufficient electrode strength. The amount of the binder is adjusted to 7% by mass or less, reduce the blending amount of the binder as an insulating material in the electrode can be reduced, and the internal resistance can be reduced.

(3) Insulating Particle Layer

As described above, the inorganic compound particles included in the insulating particle layer preferably include particles of a lithium ion-conductive substance (lithium-ion conductive particles).

Examples of materials having lithium ion conductivity include $La_{0.51}Li_{0.34}TiO_{2.94}$, $Li_{1.3}Al_{0.3}Ti_{1.7}(PO_4)$, $Li_7La_3Zr_2O_{12}$, a mixture of $Li_4SiO_4$ and $Li_3BO_3$ in a mass ratio of 50:50, $Li_{2.9}PO_{3.3}N_{0.4}$ (LIPON), $Li_{3.6}Si_{0.6}P_{0.4}O_4$, $Li_{1.07}Al_{0.69}Ti_{1.46}(PO_4)$, and $Li_{1.5}Al_{0.5}Ge_{1.5}(PO_4)$. The particles of these lithium ion conductive materials can also be referred to as solid electrolyte particles.

The inorganic compound particles may be those having non-electrical conductivity (electrical insulating property). For example, the inorganic compound particles may include oxide particles such as silica (for example, $SiO_2$) and alumina (for example, $Al_2O_3$), nitride particles such as aluminum nitride and silicon nitride, or slightly soluble ionic crystal fine particles. Examples of slightly soluble ionic crystal fine particles include particles of salts such as calcium fluoride, barium fluoride and barium sulfate, covalent crystal particles such as silicon particles, and clay fine particles such as montmorillonite and kaolinite.

The mass ratio of the particles of the lithium ion-conductive material to the inorganic compound particles is preferably 30% by mass or more, and more preferably 50% by mass or more. Most preferably, the inorganic compound particles consist of the particles of the lithium ion-conductive material.

Examples of a binder that can be contained in the insulating particle layer include, but are not limited to, polytetrafluoroethylene (PTFE), polyvinylidene fluoride (PVdF), and a cellulose-containing component such as sodium carboxymethyl cellulose (CMC-Na), fluorine-containing rubber, or styrene-butadiene rubber.

[Production Method]

The electrode composite according to the first embodiment can be produced by the following procedure, for example.

First, negative electrode active material secondary particles, a conductive agent, and a binder are provided. They are put into a suitable dispersion solvent and stirred to prepare a negative electrode slurry. As the dispersion solvent, water, N-methyl-2-pyrrolidone (NMP), and toluene can be used, for example.

On the other hand, a current collector is provided. The negative electrode slurry is applied to both or one surface of the current collector. As a coater, for example, a die coater, a curtain coater, a spray coater, a gravure coater, a coater using flexography, or a knife coater can be used, for example. An obtained coated film is dried and then pressed together with the current collector. Thus, a negative electrode active material-containing layer can be obtained.

Next, inorganic compound particles and a binder for an insulating particle layer are provided. As inorganic compound particles provided here, it is preferable to use particles which have an average particle size of from 0.1 μm to 10 μm and in which the particle size d10 is 30% or less of the average particle size, and the particle size d90 is 1.5 times or less the average particle size. They are put into a suitable dispersion solvent and stirred to prepare a first slurry. As the dispersion solvent, water, N-methyl-2-pyrrolidone (NMP), and toluene can be used, for example.

Then, the first slurry is coated onto the negative electrode active material-containing layer. As a coater, a spray coater and a gravure coater can be used, for example. Particles of a first group contained in the first slurry can enter into recesses exposed on a surface of the negative electrode active material-containing layer. Then, an obtained coated film was dried. Thus, a first portion of the insulating particle layer is obtained.

Next, another inorganic compound particles and a binder for an insulating particle layer are provided. The inorganic compound particles provided here are used as particles of a second group having a larger average particle size than that of the particles of the first group. For example, the average particle size of the particles of the second group may be from 15 µm to 30 µm. As the particles of the second group, it is preferable to use particles having a particle size distribution in which the particle size d10 is 30% or less of the average particle size and the particle size d90 is 1.5 times or less the average particle size. They are put into a suitable dispersion solvent and stirred to prepare a second slurry. As the dispersion solvent, water, N-methyl-2-pyrrolidone (NMP), and toluene can be used, for example.

Then, the second slurry is coated onto the first portion of the insulating particle layer. As a coater, a spray coater and a gravure coater can be used, for example. Then, an obtained coated film was dried. Thus, a second portion of the insulating particle layer is obtained.

Next, pressing is carried out from above the second portion of the insulating particle layer toward the current collector. Thus, it is possible to obtain an electrode composite including a negative electrode active material-containing layer and an insulating particle layer provided thereon.

Surface roughness of a second surface of the insulating particle layer can be controlled by adjusting, for example, the average secondary particle size of the negative electrode active material secondary particles, the average particle size of the particles of the first group, the average particle size of the particles of the second group, conditions of pressing the negative electrode active material-containing layer, and conditions of pressing the insulating particle layer. Specific examples of the conditions are shown in the examples below.

An electrode composite including an electrode having the bipolar structure can be produced by the same procedure as described above except for the following points.

In the method of this example, first, positive electrode active material particles, and a conductive agent and a binder which are for a positive electrode active material-containing layer are further provided. They are put into a suitable dispersion solvent and stirred to prepare a positive electrode slurry.

In the method of this example, a current collector for a bipolar electrode is provided. The negative electrode slurry described above is applied to one surface (third surface) of the current collector, and an obtained coated film is dried. Then, the positive electrode slurry is applied to the other surface (fourth surface) of the current collector, and an obtained coated film is dried. Then, the dried coated films are pressed together with the current collector. Thus, it is possible to obtain an electrode having a bipolar structure and including the current collector, a negative electrode active material-containing layer provided on the third surface of the current collector, and a positive electrode active material-containing layer provided on the fourth surface of the current collector.

By the same procedure as described above, an insulating particle layer is provided on the negative electrode active material-containing layer of the electrode thus obtained. Thus, it is possible to obtain an electrode composite including an electrode having the bipolar structure and an insulating particle layer provided on the negative electrode active material-containing layer of the electrode.

When the above-described fluorescent substance is contained in the negative electrode slurry, for example, after pressing the insulating particle layer, ultraviolet rays are irradiated to the insulating particle layer, whereby the electric insulating property of the insulating particle layer can be judged. Specifically, if there is a portion that emits light upon irradiation with ultraviolet rays, it is possible to judge that the electric insulating property of the portion is not sufficient. As an ultraviolet irradiation device, a UV/BLUE lamp (trade name: TITAN TP-8000) manufactured by Spectronics Corporation can be used, for example.

[Measuring Method]

(Method of Measuring Surface Roughness of Insulating Particle Layer)

A method of measuring surface roughness of a second surface of an insulating particle layer included in an electrode composite incorporated in a battery will be described below.

First, the battery to be measured is discharged until the remaining capacity reaches 0%. Then, the discharged battery is placed in a glove box under an inert atmosphere. Within this glove box, the container member of the battery is cut open with taking care not to create an electrical short circuit between the positive electrode and the negative electrode. An electrode connected to a negative electrode terminal are cut out from them. When an insulating particle layer is present on a surface of the cut-out electrode, there is a possibility that the cut-out electrode is the electrode composite according to the first embodiment.

Next, the cut electrode is placed in a container filled with methyl ethyl carbonate (MEC) and washed. After washing, the electrode is taken out and then vacuum-dried. In this way, methyl ethyl carbonate remaining in the electrode can be removed. Surface roughness is measured for the electrode subjected to such treatment.

Such a measurement can be carried out using, for example, Portable Surface Roughness Measurment Surftest SJ-310 made by Mitutoyo Corporation. In measurement, a surface opposite to a surface to be measured (the second surface of the insulating particle layer) is fixed to a smooth plate with a double-stick tape or the like for measurement. Measurement is carried out five times with a cutoff value set to 0.25 mm. When surface roughness Ra is more than 0.1 µm, the cutoff value is set to 0.8 mm. An average value of five measurement results is taken as the surface roughness Ra of the second surface of the insulating particle layer.

(Observation of Negative Electrode Active Material-Containing Layer and Insulating Particle Layer)

The presence, composition and average particle size of the inorganic compound particles included in the insulating particle layer, and the composition, form, and average particle size of the negative electrode active material secondary particles included in the negative electrode active material-containing layer can be examined by observing a cross-sectional structure of the electrode composite cut out from the battery, as described above, using a scanning electron microscope with an element analysis device (SEM- EDX: Scanning Electron Microscopy-Energy Dispersive X-ray Spectroscopy). That is, according to observation with SEM-EDX, it is possible to judge whether or not the negative electrode active material-containing layer includes negative electrode active material secondary particles. 50 secondary particles of the negative electrode active material are selected from a SEM image of the negative electrode active material-containing layer, and a volume average secondary particle size can be measured from the selected secondary particles. The average primary particle size of the primary particles included in the negative electrode active material-containing layer and the average particle size of particles included in each portion of the insulating particle layer can be measured in the same manner.

Thickness of the insulating particle layer can be measured from a cross-sectional image of the electrode composite obtained by observation with the scanning electron microscope. A distance from the second surface to the first surface of the insulating particle layer is measured at ten points, and the average value thereof is taken as the thickness of the insulating particle layer. Of the ten points, five points are measured with a protrusion on a surface of the negative electrode active material-containing layer as the first surface, and the remaining five points are measured with a recess on the surface of the negative electrode active material-containing layer as the first surface.

(Method of Measuring BET Specific Surface Area of Active Material)

The BET specific surface area of the active material can be measured by the method described below, for example.

The active material mass is 4 g. For example, a ½-inch evaluation cell is used. As a pretreatment method, the evaluation cell is dried under reduced pressure at a temperature of about 100° C. or higher for 15 hours, whereby degassing treatment is carried out. As a measuring apparatus, Tristar II 3020 manufactured by Shimadzu Corporation-Micromeritics Corporation is used, for example. A nitrogen gas is adsorbed while changing a pressure, and an adsorption isotherm with a relative pressure on the horizontal axis and an $N_2$ gas adsorption amount on the vertical axis is determined. Assuming that this curve follows BET theory, BET equation is adopted, whereby the specific surface area of a powder of the active material can be calculated.

Next, an example of the electrode composite according to the first embodiment will be described with reference to the drawings.

First, a first example of the electrode composite according to the first embodiment will be described with reference to FIGS. 1 and 2.

FIG. 1 is a schematic cross-sectional view of a first example of the electrode composite according to the first embodiment. FIG. 2 is an enlarged cross-sectional view of a portion A of the electrode composite shown in FIG. 1.

Figure 2:
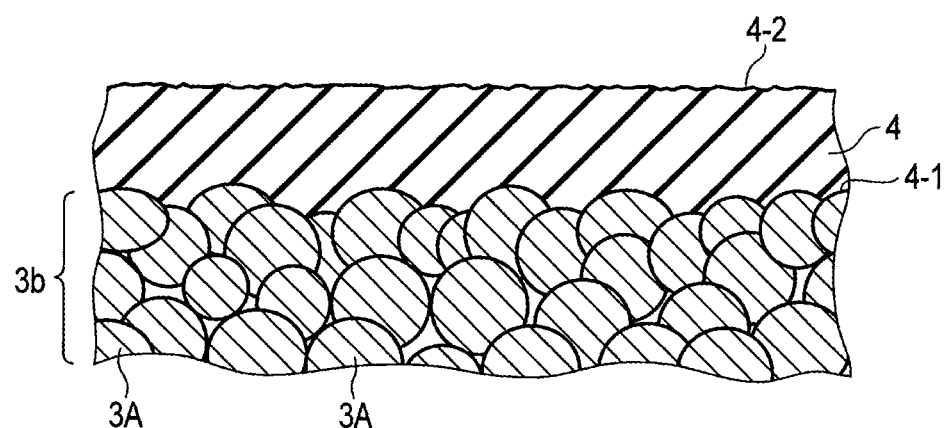
FIG. 2 is an enlarged cross-sectional view of a portion A of the electrode composite shown in FIG. 1.

An electrode composite 10 shown in FIGS. 1 and 2 has a negative electrode 3. The negative electrode 3 includes a belt-like negative electrode current collector 3*a* shown in FIG. 1 and a negative electrode active material-containing layer 3*b* supported by both surfaces of the negative electrode current collector 3*a*. Both end portions 3*c* of the negative electrode current collector 3*a* do not support the negative electrode active material-containing layer 3*b* on any surfaces.

As shown in FIG. 2, the negative electrode active material-containing layer 3*b* includes the negative electrode active material secondary particles 3A. The average secondary particle size of the negative electrode active material secondary particles is from 1 μm to 30 μm. In FIG. 2, the secondary particles are schematically indicated by circles or ellipses. Although not shown in FIG. 2, the negative electrode active material-containing layer 3*b* further contains conductive agent particles and a binder.

The electrode composite 10 shown in FIGS. 1 and 2 further includes two insulating particle layers 4. As shown in FIGS. 1 and 2, each of the insulating particle layers 4 has a first surface 4-1 and an opposing second surface 4-2.

As shown in FIG. 1 and FIG. 2, the first surface 4-1 of the insulating particle layer 4 is in contact with the negative electrode active material-containing layer 3*b*. Thus, the insulating particle layer 4 is provided on the negative electrode active material-containing layer 3*b*.

As shown in FIG. 2, the first surface 4-1, which is an interface between the negative electrode active material-containing layer 3*b* and the insulating particle layer 4, includes plural recesses that are gaps among the negative electrode active material secondary particles 3A. As shown in FIG. 2, the insulating particle layer 4 fills the gaps.

Further, as shown in FIG. 2, the second surface 4-2 of the insulating particle layer 4 does not so significantly reflect irregularities on the first surface 4-1. Specifically, the surface roughness of the second surface 4-2 is 0.1 μm or less.

Next, a second example of the electrode composite according to the first embodiment will be described with reference to FIG. 3.

Figure 3:
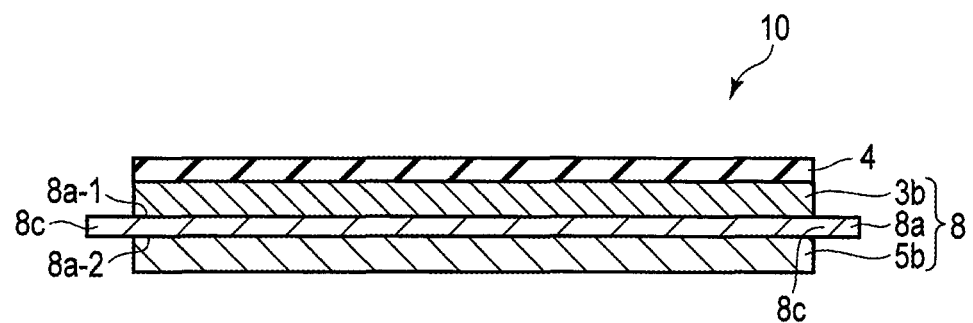
FIG. 3 is a schematic cross-sectional view of a second example of an electrode composite according to the first embodiment.

FIG. 3 is a schematic cross-sectional view of a second example of the electrode composite according to the first embodiment.

An electrode composite 10 shown in FIG. 3 includes an electrode 8 having a bipolar structure. The electrode 8 includes a belt-like current collector 8*a*. The current collector 8*a* has a third surface 8*a*-1 and an opposing fourth surface 8*a*-2.

The electrode composite 10 shown in FIG. 3 further includes a negative electrode active material-containing layer 3*b* and a positive electrode active material-containing layer 5*b*. The negative electrode active material-containing layer 3*b* is provided on the third surface 8*a*-1 of the current collector 8*a*. The negative electrode active material-containing layer 3*b* has a structure similar to that of the electrode composite 10 of the first example described with reference to FIGS. 1 and 2. The positive electrode active material-containing layer 5*b* is provided on the fourth surface 8*a*-2 of the current collector 8*a*. Both end portions 8*c* of the current collector 8*a* do not support the negative electrode active material-containing layer 3*b* nor the positive electrode active material-containing layer 5*b* on any surfaces.

The electrode composite 10 shown in FIG. 3 further includes an insulating particle layer 4 provided on the negative electrode active material-containing layer 3*b*. The insulating particle layer 4 has a structure similar to that of the electrode composite 10 of the first example described with reference to FIGS. 1 and 2.

According to the above-described first embodiment, an electrode composite is provided. This electrode composite includes a negative electrode active material-containing layer and an insulating particle layer. The negative electrode active material-containing layer includes negative electrode active material secondary particles. The average secondary particle size of the negative electrode active material secondary particles is from 1 μm to 30 μm. The insulating particle layer includes inorganic compound particles. The insulating particle layer is provided on the negative electrode active material-containing layer. The insulating particle layer has a first surface and a second surface opposed to the first surface. The first surface is in contact with the negative electrode active material-containing layer. The surface roughness of the second surface of the insulating particle layer is 0.1 μm or less. When this electrode composite is used in a secondary battery, an electrical short circuit between the negative electrode active material-containing layer and the positive electrode and side reactions of the negative electrode active material secondary particles with the electrolyte can be suppressed. As a result, the electrode composite according to the first embodiment can realize a secondary battery that can exhibit an excellent output performance.

Second Embodiment

According to a second embodiment, a secondary battery is provided. The secondary battery includes the electrode composite according to the first embodiment, and a positive electrode. The positive electrode includes a positive electrode active material-containing layer. The second surface of the insulating particle layer of the electrode composite is in contact with the positive electrode active material-containing layer.

The positive electrode may further include a positive electrode current collector. The positive electrode current collector can have a belt-like planar shape having, for example, one surface and the other surface as an opposing surface thereof (a reverse surface relative to the first surface). The positive electrode active material-containing layer may be provided on the both surfaces of the positive electrode current collector, or may be provided on one of the surfaces. The positive electrode current collector may include a portion not supporting the positive electrode active material-containing layer on any surfaces. This portion can serve as a positive electrode tab, for example.

The electrode composite and the positive electrode can constitute an electrode group. The electrode group may have a stack-type structure or a wound-type structure. In an electrode group having a stack-type structure, the electrode composite(s) and the positive electrode(s) are stacked so that the positive electrode active material-containing layer and the negative electrode active material-containing layer face each other with the insulating particle layer sandwiched therebetween. An electrode group having a wound-type structure includes a wound body obtained by winding a stack of an electrode composite and a positive electrode.

A secondary battery of a variant according to a second embodiment includes electrodes each having a bipolar structure, a first electrode composite having a bipolar structure and a second electrode composite having a bipolar structure and located next to the first electrode composite. Each electrode having the bipolar structure can have a structure similar to that of the electrode having the bipolar structure described in the description of the first embodiment. Bipolar electrodes are stacked such that, for example, a second surface of an insulating particle layer of a first electrode composite is in contact with a positive electrode active material-containing layer of a second electrode composite located next to the first electrode composite, so that an electrode group can be constituted.

The secondary battery according to the second embodiment may include a nonaqueous electrolyte. That is, the secondary battery according to the second embodiment may be a nonaqueous electrolyte battery. When the inorganic compound particles are solid electrolyte particles, this solid electrolyte can also be used as a nonaqueous electrolyte. A nonaqueous electrolyte battery as one aspect of the secondary battery according to the second embodiment may include further nonaqueous electrolyte.

For example, the secondary battery according to the second embodiment may further include a gel nonaqueous electrolyte. The insulating particle layer can be impregnated with at least a portion of the gel nonaqueous electrolyte. Thereby, the gel nonaqueous electrolyte can be held by the insulating particle layer. The gel nonaqueous electrolyte may be held by a negative electrode active material-containing layer and/or a positive electrode active material-containing layer.

In the case of using an electrode group impregnated with a gel nonaqueous electrolyte in an insulating particle layer, having a second surface with a surface roughness of more than 0.1 μm, in the secondary battery, an electrical short circuit occurs between the positive electrode and the negative electrode, so that the output performance deteriorates. On the other hand, when the secondary battery according to the second embodiment includes the electrode composite according to the first embodiment, excellent output performance can be exhibited even when a gel nonaqueous electrolyte is included. This point will be described in detail below.

There has been studied titanium-based oxides ($TiO_2(B)$) having a monoclinic β-type structure and titanium-niobium composite oxides such as $Nb_2TiO_7$, the titanium-based oxides and the titanium-niobium composite oxides having a larger theoretical capacity per unit weight than that of the spinel-type lithium titanate described above. However, a secondary battery produced using them as negative electrode active materials has a problem of a low energy density for a lithium secondary battery using a graphite-based negative electrode.

Also, in the case of a secondary battery using a liquid electrolyte, a liquid electrolyte obtained by dissolving a supporting electrolyte of a charge carrier in a solvent is used, in addition to a battery using a titanium composite oxide or a niobium composite oxide as a negative electrode. In a battery where electrode assemblies and a liquid electrolyte are accommodated in a single container, and the electrode assemblies are electrically connected in series and each of assemblies includes a positive electrode and a negative electrode, an ion-short circuit occurs among the electrode assemblies through the liquid electrolyte. Therefore, the battery cannot function as a secondary battery.

By using, for example, a gel nonaqueous electrolyte in place of the liquid electrolyte, the ion-short circuit among the electrode assemblies can be suppressed. However, there was found a problem that it is difficult to uniformly insert the gel nonaqueous electrolyte into between the positive electrode and the negative electrode. For example, it has been found that a resistance value increases in a portion where a large amount of the gel nonaqueous electrolyte is present between the electrodes, and output/input characteristics of the entire secondary battery deteriorate. On the other hand, it has been found that in a portion where the content of the gel nonaqueous electrolyte is low, the insulating property between the positive electrode and the negative electrode is less likely to be ensured, and it has been found that electrical short circuit tends to occur between the positive electrode and the negative electrode. If an electrical short circuit occurs, there is a problem that the battery does not function as a secondary battery.

On the other hand, as described above, the surface roughness of the insulating particle layer of the electrode composite according to the first embodiment is 0.1 μm or less, and therefore the insulating particle layer can have a more uniform thickness. Such an insulating particle layer can hold the gel nonaqueous electrolyte more uniformly and can sufficiently ensure the insulating property between the positive electrode and the negative electrode. Thereby, the secondary battery according to the second embodiment can exhibit an excellent output performance.

Particularly, in the electrode composite of a preferred aspect, which includes inorganic compound particles having an average secondary particle size of from 15 µm to 30 µm in an insulating particle layer, the insulating particle layer can have a space in which a gel nonaqueous electrolyte can be sufficiently held.

The secondary battery according to the aspect in which the insulating particle layer includes the above-described solid electrolyte layer may not include a further electrolyte.

The secondary battery may further include a container member, a positive electrode terminal, and a negative electrode terminal.

The container member can accommodate an electrode group. The positive electrode terminal can be electrically connected to the positive electrode. The negative electrode terminal can be electrically connected to the negative electrode.

Hereinafter, the positive electrode, the negative electrode, the gel nonaqueous electrolyte, the container member, the positive electrode terminal and the negative electrode terminal will be described in detail.

(A) Positive Electrode

The positive electrode current collector is preferably aluminum foil, or aluminum alloy foil containing at least one element selected from Mg, Ti, Zn, Mn, Fe, Cu, and Si. The average crystal particle size of the aluminum foil and the aluminum alloy foil is preferably 50 µm or less. The average crystal particle size is more preferably 30 µm or less, and further preferably 5 µm or less. The average crystal particle size of 50 µm or less can dramatically increase the strength of the aluminum foil or the aluminum alloy foil. This results in allowing the positive electrode to undergo an increase in density at high pressing pressure, and thus allowing the battery capacity to be increased.

The average crystal particle size can be measured according to the above-described method.

The average crystal particle sizes of the aluminum foil and aluminum alloy foil is affected complexly by many factors such as material structure, impurities, processing conditions, heat treatment histerisis, and annealing conditions. The crystal particle size can be adjusted by combining the previously mentioned factors in the manufacturing process of the current collector.

The aluminum foil and the aluminum alloy foil are, for example, 20 µm or less, more preferably 15 µm in thickness. The aluminum foil preferably has a purity of 99% by mass or more. An alloy containing an element such as magnesium, zinc, and silicon is preferred as the aluminum alloy. On the other hand, the content of a transition metal such as iron, copper, nickel, and chromium is preferably 1% by mass or less.

As materials of the positive electrode active material, the conductive agent and the binder which can be included in the positive electrode active material-containing layer, materials which can be included in the positive electrode active material-containing layer described in the section of first embodiment can be used.

(B) Negative Electrode

As materials of the negative electrode, the same materials as the materials of the negative electrode described in the section of first embodiment can be used.

(C) Gel Nonaqueous Electrolyte

A gel electrolyte includes a gel substance and an electrolyte dissolved in the gel substance. Since the gel electrolyte has low fluidity, the gel electrolyte can be held between a positive electrode and a negative electrode in a secondary battery without leaking.

The gel electrolyte can be prepared by the following procedure, for example. First, a liquid nonaqueous electrolyte is prepared by dissolving an electrolyte in a nonaqueous solvent. Then, a post polymer capable of forming a gel electrolyte is added to this liquid nonaqueous electrolyte. Then, by heating an obtained mixture, a gel nonaqueous electrolyte can be obtained.

As the electrolyte, there can be used lithium salts such as lithium perchlorate ($LiClO_4$), lithium hexafluorophosphate ($LiPF_6$), lithium tetrafluoroborate ($LiBF_4$), lithium hexafluoroarsenate ($LiAsF_6$), lithium hexafluoroantimonate ($LiSbF_6$), lithium trifluoromethane sulfonate ($LiCF_3SO_3$), lithium bistrifluoromethylsulfonylimide ($LiN(CF_3SO_2)_2$), lithium bis(pentafluoroethanesulfonyl)imide ($Li(C_2F_5SO_2)_2N$), lithium bis(oxalato)borate ($LiB(C_2O_4)_2$), and lithium difluoro (trifluoro-2-oxide-2-trifluoro-methylpropionato (2-)-0,0) borate ($LiBF_2(OCOOC(CF_3)_2]$. As the electrolyte, one of the above compounds may be used alone, or a mixture of two or more thereof may be used. It is preferable that the electrolyte is hardly oxidized even at a high potential, and $LiBF_4$ or $LiPF_6$ is most preferable.

The concentration of electrolyte salt is preferably from 1 M to 3 M. This makes the viscosity of the nonaqueous electrolyte moderate and can achieve an excellent performance even when a high load current flows.

Examples of nonaqueous solvents include cyclic carbonates such as propylene carbonate (PC), ethylene carbonate (EC), dipropyl carbonate (DPC) and vinylene carbonate, chain carbonates such as diethyl carbonate (DEC), dimethyl carbonate (DMC), and methyl ethyl carbonate (MEC), cyclic ethers such as tetrahydrofuran (THF), 2-methyl tetrahydrofuran (2MeTHF) and dioxolane (DOX), chain ethers such as dimethoxyethane (DME) and diethoethane (DEE), γ-butyrolactone (GBL), acetonitrile (AN), and sulfolane (SL). As a nonaqueous solvent, one of these solvents can be used alone, or a mixed solvent in which two or more solvents are mixed can be used.

The nonaqueous electrolyte may contain additives. The additive is not particularly limited, but examples thereof include vinylene acetate (VA), vinylene butyrate, vinylene hexanate, vinylene crotonate, and catechol carbonate. The concentration of the additive is preferably from 0.1% by mass to 3% by mass with respect to the mass of the nonaqueous electrolyte before the addition of the additive. A more preferred range is from 0.5% by mass to 1% by mass.

As a post polymer suitable for gel electrolyte formation, there can be used, for example, polyvinylidene fluoride, a vinylidene fluoride-hexafluoropropylene copolymer, polyacrylonitrile, polyethylene oxide, polypropylene oxide, an ethylene oxide-propylene oxide copolymer, and a cross-linked polymer containing an ethylene oxide chain as a main chain or a side chain. As the post polymer, one of these can be used alone, or a mixture of two or more of these can be used.

The post polymer can be mixed with the liquid nonaqueous electrolyte so that a volume ratio of post polymer:liquid nonaqueous electrolyte is 1:1 to 4:1, for example.

For example, the liquid nonaqueous electrolyte containing the post polymer is impregnated into an electrode group including the electrode composite according to the first embodiment and this electrode group is subjected to heat-treatment at a temperature of 40° C. to 80° C. in an inert atmosphere, and thereby a gel nonaqueous electrolyte impregnated in the electrode group can be obtained. The gel nonaqueous electrolyte thus prepared is impregnated in the negative electrode active material-containing layer, the positive electrode active material-containing layer and the insulating particle layer, respectively.

(D) Container Member

For example, a laminate film of 0.2 mm or less in wall thickness or a metallic container of 1.0 mm or less in wall thickness can be used as the container member. The metallic container is preferably 0.5 mm or less in wall thickness.

The shape of the container member may be a flattened shape, a square shape, a cylindrical shape, a coin shape, a button shape, a sheet shape, or a stacked shape, depending on the intended use of the secondary battery according to the present embodiment. The intended use of the secondary battery according to the present embodiment can be, for example, a small-size battery installed in a portable electronic device or the like, or a large-size battery installed in a vehicle such as a two-wheel to four-wheel automobile.

The laminate film is a multilayer film including a metal layer and a resin layer that coats the metal layer. For the reduction in weight, the metal layer is preferably aluminum foil or aluminum alloy foil. The resin layer intended to reinforce the metal layer can use polymers such as polypropylene (PP), polyethylene (PE), nylon, and polyethylene terephthalate (PET). The laminate film can be formed into the shape of the container member through sealing by thermal fusion bonding.

For example, aluminum or an aluminum alloy can be used for the metallic container. The aluminum alloy is preferably an alloy containing an element such as magnesium, zinc, and silicon. On the other hand, the content of transition metals such as iron, copper, nickel, and chromium is preferably 1% by weight or less. Thus, it becomes possible to improve long-term reliability and radiation performance dramatically under a high-temperature environment.

The metallic container of aluminum or an aluminum foil, for example, a metallic can is preferably 50 µm or less in average crystal particle size. The average crystal particle size is more preferably 30 µm or less. The average crystal particle size is further preferably 5 µm or less. The average crystal particle size adjusted to 50 µm or less can dramatically increase the strength of the metallic can of aluminum or an aluminum alloy. In addition, the size can further make the can thin-walled. As a result, a battery suitable for an in-vehicle application can be provided which is light in weight, high in output, and excellent in long-term reliability.

(E) Negative Electrode Terminal

The negative electrode terminal can be formed from, for example, a material that is electrically stable at a potential within the range of 0.4 V (vs Li/Li$^+$) to 3 V (vs Li/Li$^+$) with respect to the redox potential of lithium, and has electrical conductivity. Specifically, examples of the material include an aluminum alloy containing an element such as Mg, Ti, Zn, Mn, Fe, Cu, and Si, and aluminum. The same material as the negative electrode current collector is preferred in order to reduce the contact resistance.

(F) Positive Electrode Terminal

The positive electrode terminal can be formed from a material that is electrically stable at a potential within the range of 3 V (vs Li/Li$^+$) to 5 V (vs Li/Li$^+$) with respect to the redox potential of lithium, and has electrical conductivity. Specifically, examples of the material include an aluminum alloy containing an element such as Mg, Ti, Zn, Mn, Fe, Cu, and Si, and aluminum. The same material as the positive electrode current collector is preferred in order to reduce the contact resistance.

Next, several examples of the secondary battery according to the second embodiment will be described with reference to the drawings.

First, a first example of a secondary battery will be described with reference to FIGS. 4 and 5.

Figure 4:
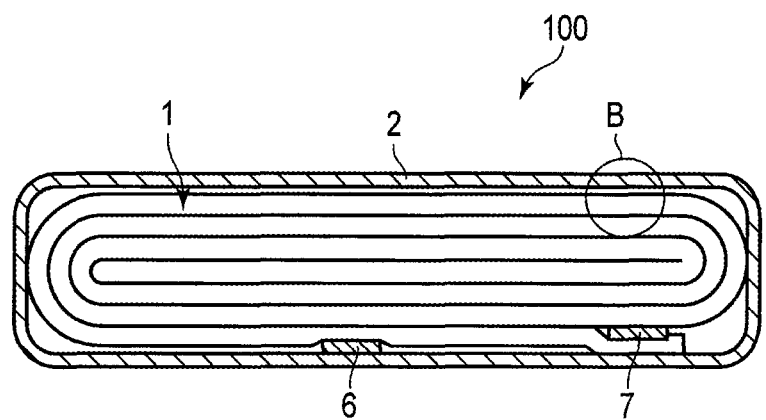
FIG. 4 is a schematic cross-sectional view of a first example of a secondary battery according to a second embodiment.

FIG. 4 is a schematic cross-sectional view of a first example of a secondary battery according to the second embodiment. FIG. 5 is an enlarged cross-sectional view of a portion B of the secondary battery shown in FIG. 4.

The secondary battery 100 shown in FIGS. 4 and 5 includes a bag-like container member 2 shown in FIG. 4, an electrode group 1 shown in FIGS. 4 and 5, and a gel nonaqueous electrolyte (not shown). That is, the secondary battery 100 shown in FIGS. 4 and 5 is a nonaqueous electrolyte battery. The electrode group 1 and the gel nonaqueous electrolyte are housed in the container member 2. The gel nonaqueous electrolyte (not shown) is held by the electrode group 1.

The bag-like container member 2 is made of a laminate film including two resin layers and a metal layer sandwiched therebetween.

As shown in FIG. 4, the electrode group 1 is a flat wound electrode group. As shown in FIG. 5, the flat wound electrode group 1 includes a negative electrode 3, an insulating particle layer 4, and a positive electrode 5. The insulating particle layer 4 is sandwiched between the negative electrode 3 and the positive electrode 5.

The negative electrode 3 includes a negative electrode current collector 3a and a negative electrode active material-containing layer 3b. As shown in FIG. 5, in a portion of the negative electrode 3 located in the outermost layer of the wound electrode group 1, the negative electrode active material-containing layer 3b is formed only on the inner surface side of the negative electrode current collector 3a. The other portion in the negative electrode 3 includes the negative electrode active material-containing layer 3b formed on each of both surfaces of the negative electrode current collector 3a.

The positive electrode 5 includes a positive electrode current collector 5a and a positive electrode active material-containing layer 5b formed on each of both surfaces of the positive electrode current collector 5a.

The insulating particle layer 4 has the same structure as that of the insulating particle layer 4 shown in FIG. 2. That is, the insulating particle layer 4 has a first surface 4-1 and an opposing second surface 4-2. The first surface 4-1 of the insulating particle layer 4 is in contact with the negative electrode active material-containing layer 3b. The second surface 4-2 of the insulating particle layer 4 is in contact with the positive electrode active material-containing layer 5b.

As shown in FIG. 4, a negative electrode terminal 6 and a positive electrode terminal 7 are located in the vicinity of the outer peripheral end of the wound electrode group 1. The negative electrode terminal 6 is connected to a part of the negative electrode current collector 3a of the negative electrode 3 located in the outermost layer. The positive electrode terminal 7 is connected to the positive electrode current collector 5a of the positive electrode 5 located in the outermost layer. The negative electrode terminal 6 and the positive electrode terminal 7 extend to the outside from an opening part of the bag-like container member 2. The bag-like container member 2 is heat-sealed with a thermoplastic resin layer provided on the inner surface thereof.

Next, a second example of a secondary battery will be described with reference to FIGS. 6 and 7.

FIG. 6 is a partially cutaway perspective view schematically showing a second example of a secondary battery according to the second embodiment. FIG. 7 is a schematic cross-sectional view of a set of a positive electrode and a negative electrode included in the secondary battery shown in FIG. 6.

Figure 7:
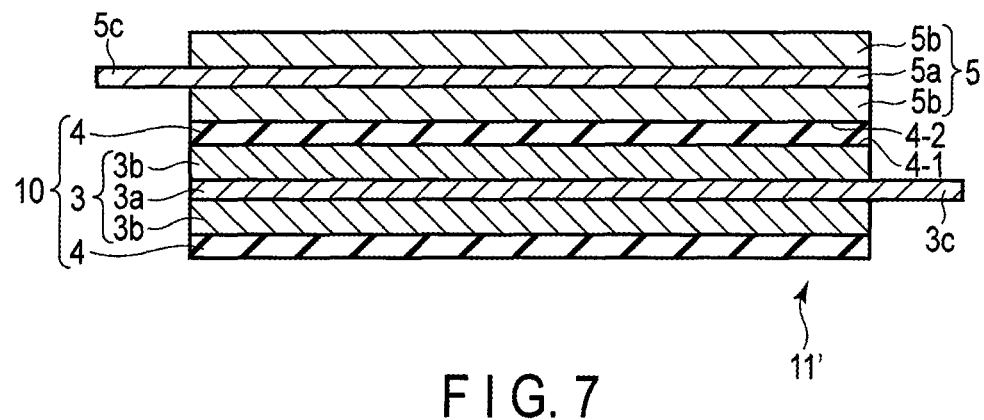
FIG. 7 is a schematic cross-sectional view of a set of a positive electrode and a negative electrode included in the secondary battery shown in FIG. 6.

A secondary battery 100 shown in FIGS. 6 and 7 includes an electrode group 11 shown in FIG. 6, a container member 12 shown in FIG. 6, and a gel nonaqueous electrolyte (not shown). That is, the secondary battery 100 shown in FIGS. 6 and 7 is a nonaqueous electrolyte battery. The electrode group 11 and the gel nonaqueous electrolyte are housed in the container member 12. The nonaqueous electrolyte is held in the electrode group 11.

The container member 12 is made of a laminate film including two resin layers and a metal layer sandwiched between the resin layers.

FIG. 7 shows a set of an electrode assembly 11' included in the electrode group 11. The electrode group 11 shown in FIG. 6 includes sets of the electrode assemblies 11'.

As shown in FIG. 7, the electrode assembly 11' includes a negative electrode 3 and a positive electrode 5. As shown in FIG. 7, the negative electrode 3 includes a negative electrode current collector 3a and a negative electrode active material-containing layer 3b supported on each of both surfaces of the negative current collector 3a. A part 3c of the negative electrode current collector 3a of the negative electrode 3 protrudes at one side from the negative electrode 3. The protruded part 3c of the negative electrode current collector 3a is electrically connected to a strip-shaped negative electrode terminal 16 shown in FIG. 6. The positive electrode 5 includes a positive electrode current collector 5a and a positive electrode active material-containing layer 5b supported on each of both surfaces of the positive current collector 5a. A part 5c of the positive electrode current collector 5a of the positive electrode 5, located at the side opposed to the protruded part 3c of the negative electrode current collector 3a, protrudes from the positive electrode 5. The protruded part 5c of the positive electrode current collector 5a is electrically connected to a strip-shaped positive electrode terminal 17 shown in FIG. 6.

As shown in FIG. 7, the electrode assembly 11' further includes a insulating particle layer 4. The insulating particle layer 4 has the same structure as that of the insulating particle layer 4 shown in FIG. 2. The first surface 4-1 of the insulating particle layer 4 is in contact with the negative electrode active material-containing layer 3b. The second surface 4-2 of the insulating particle layer 4 is in contact with the positive electrode active material-containing layer 5b.

Electrode assemblies 11' each having the same structure as that of the electrode assembly 11' shown in FIG. 7 are stacked to constitute the electrode group 11 shown in FIG. 6. In the electrode group 11, the second surface 4-2 of the insulating particle layer 4 of one electrode assembly 11' is in contact with the positive electrode active material-containing layer 5b of another electrode assembly 11'. In the electrode group 11, parts 3c of the negative electrode current collectors 3a of the electrode assemblies 11' protrude from the negative electrodes 3 in the same direction, and parts 5c of the positive electrode current collectors 5a of the electrode assemblies 11' protrude from the positive electrodes 5 in the same direction.

The tip of the strip-shaped positive electrode terminal 17 is opposed to the negative electrode terminal 16. The tip of each of the positive electrode terminal 17 and the negative electrode terminal 16 are extended out from the container member 12.

An electrode group that can be included in a secondary battery according to the second embodiment is not limited to those shown in FIGS. 4 to 7.

Figure 8:
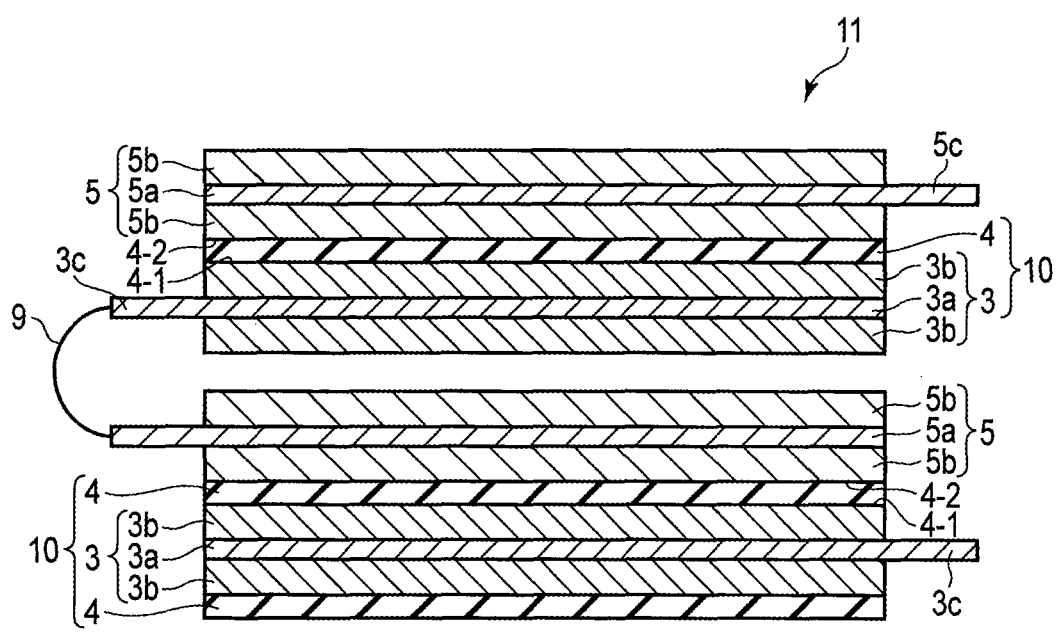
FIG. 8 is a schematic cross-sectional view of one example of an electrode group that can be included in a secondary battery according to the second embodiment.

FIG. 8 is a schematic cross-sectional view of one example of an electrode group that can be included in a secondary battery according to the second embodiment.

The electrode group 11 shown in FIG. 8 includes two electrode composites 10 and two positive electrodes 5

Each electrode composite 10 includes a negative electrode 3. The negative electrode 3 includes a strip-shaped negative electrode current collector 3a and a negative electrode active material-containing layer 3b supported on each of both surfaces of the negative current collector 3a. The negative electrode current collector 3a includes a part 3c which does not support the negative electrode active material-containing layer 3b on the surface thereof, at one end.

One electrode composite 10 further includes two insulating particle layers 4. The other electrode composite 10 further includes an insulating particle layer 4. These insulating particle layer 4 have the same structure as that of the insulating particle layer 4 shown in FIG. 2.

Each positive electrode 5 includes a strip-shaped positive electrode current collector 5a and a positive electrode active material-containing layer 5b supported on each of both surfaces of the positive current collector 5a. The positive electrode current collector 5a includes a part 5c which does not support the positive electrode active material-containing layer 5b on the surface thereof, at one end.

Each positive electrode 5 is provided on the insulating particle layer 4 of each electrode composite 10. One positive electrode active material-containing layer 5b of each positive electrode 5 is in contact with the second surface 4-2 of the insulating particle layer 4.

Moreover, as shown in FIG. 8, the part 3c of the negative electrode current collector 3a of one electrode composite 10 is electrically connected to the part 5c of the positive electrode current collector 5a of one positive electrode 5 via a lead 9. The two electrode composites 10 and the two positive electrode thus electrically connected constitute the electrode group 11.

Next, an example of an electrode group including electrodes each having a bipolar structure will be described with reference to FIG. 9.

Figure 9:
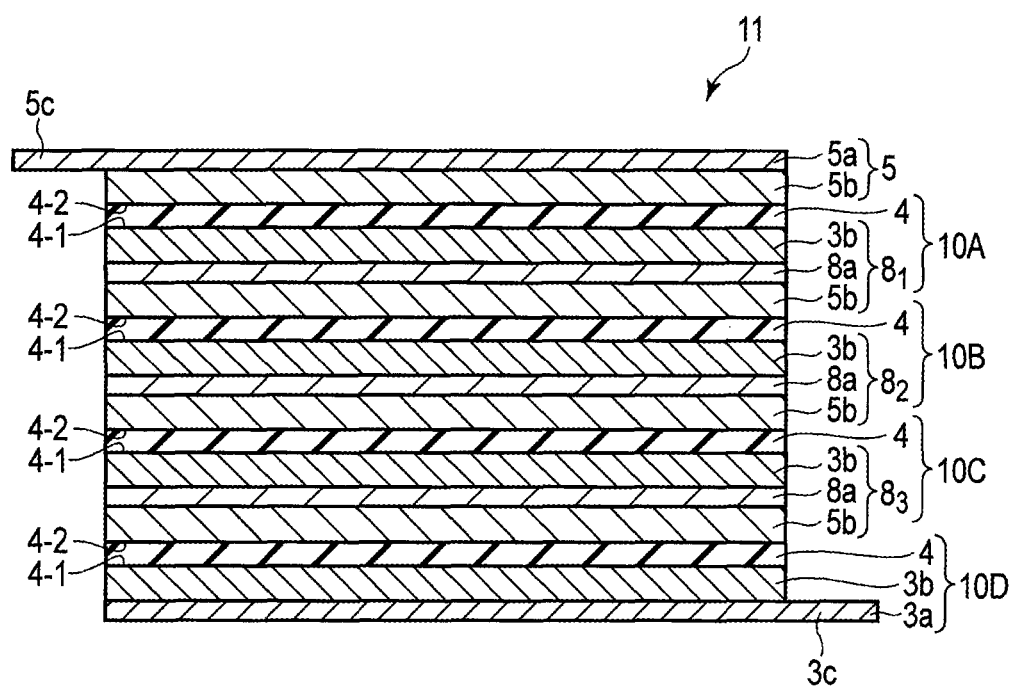
FIG. 9 is a schematic cross-sectional view of another example of an electrode group that can be included in a secondary battery according to the second embodiment.

FIG. 9 is a schematic cross-sectional view of another example of an electrode group that can be included in a secondary battery according to the second embodiment.

The electrode group 11 shown in FIG. 9 includes four electrode composites 10A, 10B, 10C and 10D, and a positive electrode 5.

Each of the electrode composites 10A, 10B, and 10C has the same structure as that of the electrode composite 10 described with reference to FIG. 3. That is, the electrode composite 10A includes an electrode $8_1$ having a bipolar structure and an insulating particle layer 4 provided on a negative electrode active material-containing layer 3b of the electrode $8_1$. The electrode composite 10B includes an electrode $8_2$ having a bipolar structure and an insulating particle layer 4 provided on a negative electrode active material-containing layer 3b of the electrode $8_2$. The electrode composite 10C includes an electrode $8_3$ having a bipolar structure and an insulating particle layer 4 provided on a negative electrode active material-containing layer 3b of the electrode $8_3$.

The electrode composite 10D includes a strip-shaped negative electrode current collector 3a, a negative electrode active material-containing layer 3b supported on one surface of the negative electrode current collector 3a, and an insulating particle layer 4 provided on the negative electrode active material-containing layer 3b. One end 3c of the negative electrode current collector 3a does not support the negative electrode active material-containing layer 3b on the surface thereof.

The positive electrode 5 includes a strip-shaped positive electrode current collector 5a and a positive electrode active material-containing layer 5b supported on one surface of the positive electrode current collector 5a. One end 5c of the positive electrode current collector 5a does not support the positive electrode active material-containing layer 5b on the surface thereof.

As shown in FIG. 9, the positive electrode 5, the electrode composite 10A, the electrode composite 10B, the electrode composite 10C, and the electrode composite 10D are stacked in this order to constitute the electrode group 11.

The insulating particle layer 4 included in each of the electrode composite 10A to 10D has the same structure as that of the insulating particle layer 4 shown in FIG. 2. The positive electrode active material-containing layer 5b of the positive electrode 5 is in contact with the second surface 4-2 of the insulating particle layer 4 of the electrode composite 10A. The positive electrode active material-containing layer 5b of the electrode composite 10A is in contact with the second surface 4-2 of the insulating particle layer 4 of the electrode composite 10B. The positive electrode active material-containing layer 5b of the electrode composite 10B is in contact with the second surface 4-2 of the insulating particle layer 4 of the electrode composite 10C. The positive electrode active material-containing layer 5b of the electrode composite 10C is in contact with the second surface 4-2 of the insulating particle layer 4 of the electrode composite 10D.

The secondary battery according to the second embodiment includes the electrode composite according to the first embodiment. Therefore, the secondary battery can exhibit an excellent output performance.

Third Embodiment

According to a third embodiment, a battery module is provided. The battery module according to the third embodiment includes secondary batteries each according to the second embodiment.

In the battery module according to the third embodiment, each of the single-batteries may be electrically connected and arranged in series, in parallel, or in a combination of series connection and parallel connection.

Next, an example of a battery module according to the third embodiment will be described with reference to the drawings.

FIG. 10 is a perspective view schematically showing one example of a battery module according to the third embodiment. A battery module 200 shown in FIG. 10 includes five single-batteries 100, four bus bars 21, a positive electrode-side lead 22, and a negative electrode-side lead 23. Each of the five single-batteries 100 is a secondary battery according to the second embodiment.

Each bus bar 21 connects a negative electrode terminal 6 of one single-battery 100 and a positive electrode terminal 7 of a neighboring single-battery 100. The five single-batteries 100 are thus connected in series via the four bus bars 21. That is, the battery module 200 shown in FIG. 10 is a battery module of five series-connection.

As shown in FIG. 10, the positive electrode terminal 7 of the single-battery 100 located at the left end of the five single-batteries 100 is connected to the positive electrode-side lead 22 for external connection. In addition, the negative electrode terminal 6 of the single-battery 100 located at the right end of the five single-batteries 100 is connected to the negative electrode-side lead 23 for external connection.

The battery module according to the third embodiment includes the secondary battery according to the second embodiment. Hence, the battery module according to the third embodiment can exhibit an excellent output performance.

Fourth Embodiment

According to a fourth embodiment, a battery pack is provided. The battery pack includes the battery module according to the third embodiment. The battery pack may include a single secondary battery according to the second embodiment instead of the battery module according to the third embodiment.

The battery pack according to the fourth embodiment may further include a protective circuit. The protective circuit has a function to control charging and discharging of the secondary battery. Alternatively, a circuit included in an equipment (for example, electronic devices, vehicles, and the like) where the battery pack serves as a power source may be used as the protective circuit for the battery pack.

Moreover, the battery pack may further include an external power distribution terminal. The external power distribution terminal is configured to externally output the current from the secondary battery, and to input external current to the secondary battery. In other words, when the battery pack is used as a power source, the current is externally provided via the external power distribution. Also, when the battery pack is charged, the charging current (including a regenerative energy from motive force of vehicles such as automobiles) is provided to the battery pack via the external power distribution terminal.

Next, a battery pack as an example according to the fourth embodiment will be described with reference to the drawings.

FIG. 11 is an exploded perspective view showing one example of a battery pack according to the fourth embodiment. FIG. 12 is a block diagram showing an electric circuit of the battery pack in FIG. 11.

A battery pack 300 shown in FIGS. 11 and 12 includes a housing container 31, a lid 32, protective sheets 33, a battery module 200, a printed wiring board 34, a wiring 35, an insulating plate (not shown).

The housing container 31 is configured to be able to house the protective sheets 33, the battery module 200, the printed wiring board 34, and the wiring 35. The lid 32 is placed on the hosing container 31 to house the battery module 200 and the like. Each of the housing container 31 and the lid 32 is provided with an opening, a connection terminal or the like (not shown) which is to be connected to an external device or the like.

Protective sheets 33 are arranged on both internal surfaces in a long side direction of the housing container 31 and on one internal surface which faces the printed wiring board 34 via battery module 200 in a short side direction of the housing container 31. The protective sheets 33 are made of, for example, rubber or resin.

The battery module 200 includes single-batteries 100, a positive electrode-side lead 22, a negative electrode-side lead 23, and an adhesive tape 24. The battery module 200 may be one single-battery 100.

Each of the single-batteries 100 has the structure shown in FIGS. 4 and 5. At least one of the single-batteries 100 is a secondary battery according to the second embodiment. The single-batteries 21 are stacked so that the negative electrode terminals 6 and the positive electrode terminals 7 extended outside are arranged in the same direction. The single-batteries 100 are electrically connected series as shown in FIG. 12. The single-batteries 100 may be connected in parallel, or in a combination of series connection and parallel connection. If the plural single-batteries 100 are connected in parallel, the battery capacity increases as compared to a case in which they are connected in series.

The adhesive tape 24 fastens the single-batteries 100. In place of the adhesive tape 24, a heat-shrinkable tape may be used to fix the single-batteries 100. In this case, protective sheets are provided on the both sides of the battery module 200, a heat-shrinkable tape is revolved around the battery module, and the heat-shrinkable tape is thermally shrunk to bundle the single-batteries.

An end of the positive electrode-side lead 22 is connected to the positive electrode terminal 7 of the single-battery 100 located at the bottom layer of the stack of the single-batteries 100. An end of the negative electrode-side lead 23 is connected to the negative electrode terminal 6 of the single-battery 100 located at the top layer of the stack of the single-batteries 100.

A printed wiring board 34 is provided with a positive electrode-side connector 341, a negative electrode-side connector 342, a thermistor 343, a protective circuit 344, wires 345 and 346, an external power distribution terminal 347, a plus-side wire 348a and a minus-side wire 348b. One main surface of the printed wiring board 34 faces the side plane of the battery module 200 where the negative electrode terminals 6 and the positive electrode terminals 7 of the are extended. The insulating plate (not shown) is provided between the printed wiring board 34 and the battery module 200.

The positive electrode-side connector 341 is provided a through hole. The other end of the positive electrode-side lead 22 is inserted into the through hole so as to electrically connect the positive electrode-side connector 341 to the positive electrode-side lead 22. The negative electrode-side connector 342 is provided a through hole. The other end of the negative electrode-side lead 23 is inserted into the through hole so as to electrically connect the negative electrode-side connector 342 to the negative electrode-side lead 23.

The thermistor 343 is fixed on one main surface of the printing wiring board 34. The thermistor 343 detects the temperature of each single-battery 100 and transmits the detection signal to the protective circuit 344.

The external power distribution terminal 347 is fixed on the other main surface of the printed wiring board 34. The external power distribution terminal 347 is electrically connected to a device that exists outside the battery pack 300.

The protective circuit 344 is fixed on the other main surface of the printed wiring board 34. The protective circuit 344 is connected to the external power distribution terminal 347 via the positive-side wire 348a. The protective circuit 344 is connected to the external power distribution terminal 347 via the negative-side wire 348b. In addition, the protective circuit 344 is electrically connected to the positive electrode-side connector 341 via the wire 345. The protective circuit 344 is electrically connected to the negative electrode-side connector 342 via the wire 346. Furthermore, the protective circuit 344 is electrically connected to each of the single-batteries 100 via the wire 35.

The protective circuit 344 controls charge and discharge of the plural single-batteries 100. The protective circuit 344 is also configured to cut-off electric connection between the protective circuit 344 and the external power distribution terminal 347 to an external device, based on detection signals transmitted from the thermistor 343 or detection signals transmitted from each single-battery 100 or the battery module 200.

An example of the detection signal transmitted from the thermistor 343 is a signal representing that the temperature of the single-battery 100 is detected to be a predetermined temperature or more. An example of the detection signal transmitted from each single-battery 100 or the battery module 200 is a signal representing detection of over-charge, over-discharge, and overcurrent of the single-battery 100. If over-charge or the like is detected for each of the single-batteries 100, the battery voltage may be detected, or a positive electrode potential or negative electrode potential may be detected. In the latter case, a lithium electrode to be used as a reference pole is inserted into each single-battery 100.

Note that as the protective circuit 344, a circuit included in a device (for example, an electronic device or an automobile) that uses the battery pack 300 as a power supply may be used.

Such a battery pack 300 is used in, for example, a application where the battery pack 300 is required to have an excellent cycle performance when a large current is output. More specifically, the battery pack 300 is used as, for example, a power supply for an electronic device, a stationary battery, or an onboard battery for a vehicle or a railway vehicle. As the electronic device, for example, a digital camera can be used. The battery pack 300 is particularly preferably used as an onboard battery.

As described above, the battery pack 300 includes the external power distribution terminal 347. Hence, the battery pack 300 can output a current from the battery module 200 to an external device and input a current from the external device to the battery module 200 via the external power distribution terminal 347. In other words, when using the battery pack 300 as a power supply, the current from the battery module 200 is supplied to the external device via the external power distribution terminal 347. When charging the battery pack 300, a charge current from the external device is supplied to the battery pack 300 via the external power distribution terminal 347. If the battery pack 300 is used as an onboard battery, the regenerative energy of the motive force of a vehicle can be used as the charge current from the external device.

Note that the battery pack 300 may include battery modules 200. In this case, the battery modules 200 may be connected in series, in parallel, or in a combination of series connection and parallel connection. The printed wiring board 34 and the wire 35 may be omitted. In this case, the positive electrode-side lead 22 and the negative electrode-side lead 23 may be used as the external power distribution terminal.

The battery pack according to the fourth embodiment includes the secondary battery according to the second embodiment or the battery module according to the third embodiment. Hence, the battery pack according to the fourth embodiment can exhibit an excellent output performance.

Fifth Embodiment

According to a fifth embodiment, a vehicle is provided. The battery pack according to the fourth embodiment is installed on this vehicle.

In the vehicle according to the fifth embodiment, the battery pack is configured, for example, to recover a regenerative energy from a motive force of the vehicle.

Examples of the vehicle according to the fifth embodiment include two to four-wheeled hybrid electric automobiles, two to four-wheeled electric automobiles, electric assist bicycles, and rail way cars.

In the vehicle according to the fifth embodiment, the installing position of the battery pack is not particularly limited. For example, in the case where the battery pack is installed in a automobile, the battery pack may be installed in the engine compartment of the vehicle, in rear parts of the vehicle, or under seats.

An example of the vehicle according to the fifth embodiment is explained below, with reference to the drawings.

FIG. 13 is a schematic sectional view showing one example of a vehicle according to the fifth embodiment.

A vehicle 400 shown in FIG. 13 includes a vehicle body 40 and a battery pack 300 according to the fourth embodiment.

The vehicle 400 shown in FIG. 13 is a four-wheeled automobile. As the vehicle 400, for example, two- to four-wheeled hybrid electric automobiles, two- to four-wheeled electric automobiles, electric assist bicycles, and railway cars may be used.

This vehicle 400 may have plural battery packs 300 installed. In such a case, the battery packs 300 may be connected in series, connected in parallel, or connected in a combination of in-series connection and in-parallel connection.

The battery pack 300 is installed in an engine compartment located at the front of the vehicle body 40. The location of installing the battery pack 300 is not particularly limited. The battery pack 300 may be installed in rear sections of the vehicle body 40, or under a seat. The battery pack 300 may be used as a power source of the vehicle 400. The battery pack 300 can also recover regenerative energy from motive force of the vehicle 400.

Figure 14:
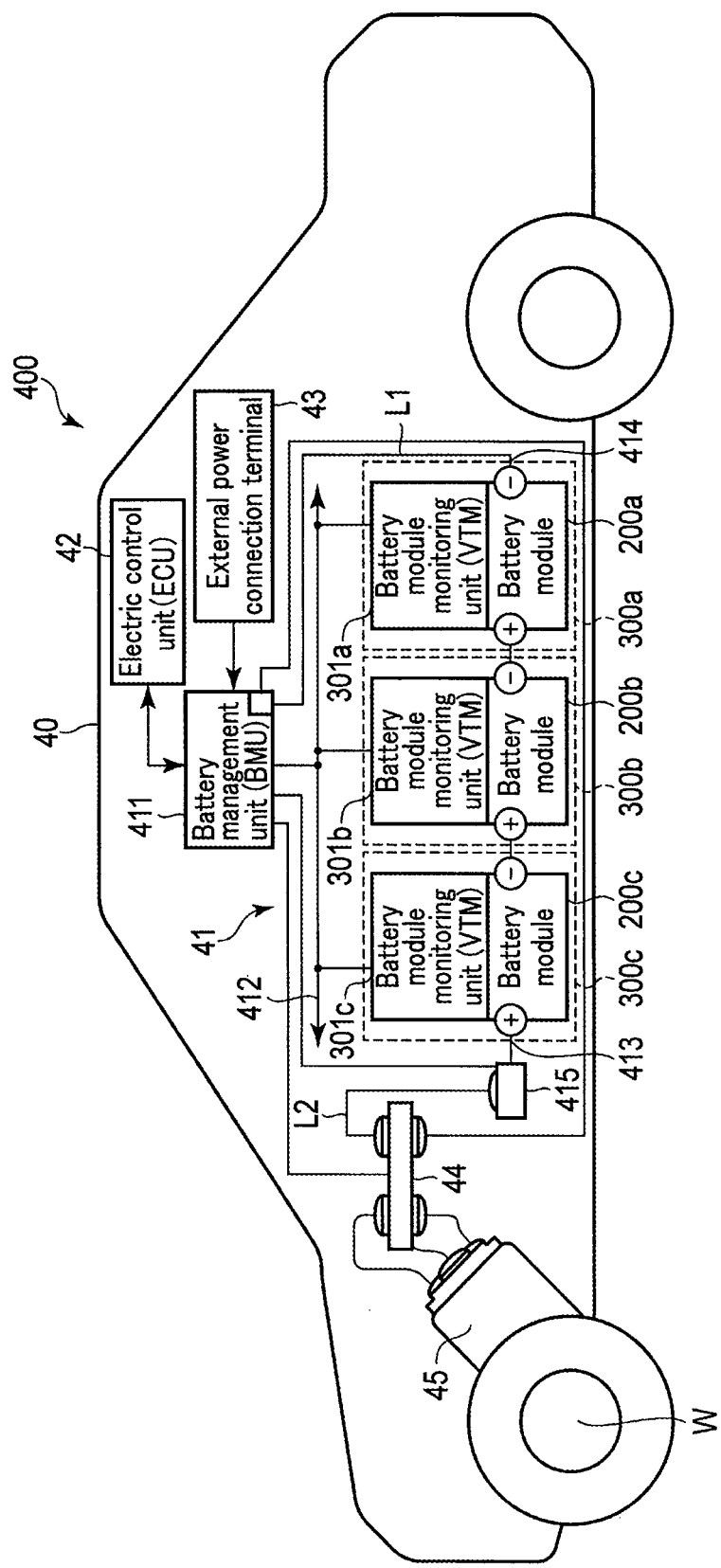
FIG. 14 is schematic view showing another example of a vehicle according to the fifth embodiment.

Next, with reference to FIG. 14, an aspect of the vehicle according to the fifth embodiment is explained.

FIG. 14 shows another example of a vehicle according to the fifth embodiment. A vehicle 400, shown in FIG. 14, is an electric automobile.

The vehicle 400, shown in FIG. 14, includes a vehicle body 40, a vehicle power source 41, a vehicle ECU (electric control unit) 42, which is a master controller of the vehicle power source 41, an external terminal (an external power connection terminal) 43, an inverter 44, and a drive motor 45.

The vehicle 400 includes the vehicle power source 41, for example, in the engine compartment, in the rear sections of the automobile body, or under a seat. In FIG. 14, the position of the vehicle power source 41 installed in the vehicle 400 is schematically shown.

The vehicle power source 41 includes plural (for example, three) battery packs 300a, 300b and 300c, a battery management unit (BMU) 411, and a communication bus 412.

The three battery packs 300a, 300b and 300c are electrically connected in series. The battery pack 300a includes a battery module 200a and a battery module monitoring unit (VTM: voltage temperature monitoring) 301a. The battery pack 300b includes a battery module 200b, and a battery module monitoring unit 301b. The battery pack 300c includes a battery module 200c, and a battery module monitoring unit 301c. The battery packs 300a, 300b and 300c can each be independently removed, and may be exchanged by a different battery pack 300.

Each of the battery modules 200a to 200c includes plural single-batteries connected in series. At least one of the plural single-batteries is the secondary battery according to the second embodiment. The battery modules 200a to 200c each perform charging and discharging via a positive electrode terminal 413 and a negative electrode terminal 414.

In order to collect information concerning security of the vehicle power source 41, the battery management unit 411 performs communication with the battery module monitoring units 301a to 301c and collects information such as voltages or temperatures of the single-batteries 100 included in the battery modules 200a to 200c included in the vehicle power source 41.

The communication bus 412 is connected between the battery management unit 411 and the battery module monitoring units 301a to 301c. The communication bus 412 is configured so that multiple nodes (i.e., the battery management unit and one or more battery module monitoring units) share a set of communication lines. The communication bus 412 is, for example, a communication bus configured based on CAN (Control Area Network) standard.

The battery module monitoring units 301a to 301c measure a voltage and a temperature of each single-battery in the battery modules 200a to 200c based on commands from the battery management unit 411. It is possible, however, to measure the temperatures only at several points per battery module, and the temperatures of all of the single-batteries need not be measured.

The vehicle power source 41 may also have an electromagnetic contactor (for example, a switch unit 415 shown in FIG. 14) for switching connection between the positive electrode terminal 413 and the negative electrode terminal 414. The switch unit 415 includes a precharge switch (not shown), which is turned on when the battery modules 200a to 200c are charged, and a main switch (not shown), which is turned on when battery output is supplied to a load. The precharge switch and the main switch include a relay circuit (not shown), which is turned on or off based on a signal provided to a coil disposed near the switch elements.

The inverter 44 converts an inputted direct current voltage to a three-phase alternate current (AC) high voltage for driving a motor. Three-phase output terminal(s) of the inverter 44 is (are) connected to each three-phase input terminal of the drive motor 45. The inverter 44 controls an output voltage based on control signals from the battery management unit 411 or the vehicle ECU 41, which controls the entire operation of the vehicle.

The drive motor 45 is rotated by electric power supplied from the inverter 44. The rotation is transferred to an axle and driving wheels W via a differential gear unit, for example.

The vehicle 400 also includes a regenerative brake mechanism, though not shown. The regenerative brake mechanism rotates the drive motor 45 when the vehicle 400 is braked, and converts kinetic energy into regenerative energy, as electric energy. The regenerative energy, recovered in the regenerative brake mechanism, is inputted into the inverter 44 and converted to direct current. The direct current is inputted into the vehicle power source 41.

One terminal of a connecting line L1 is connected via a current detector (not shown) in the battery management unit 411 to the negative electrode terminal 414 of the vehicle power source 41. The other terminal of the connecting line L1 is connected to a negative electrode input terminal of the inverter 44.

One terminal of a connecting line L2 is connected via the switch unit 415 to the positive electrode terminal 413 of the vehicle power source 41. The other terminal of the connecting line L2 is connected to a positive electrode input terminal of the inverter 44.

The external terminal 43 is connected to the battery management unit 411. The external terminal 43 is able to connect, for example, to an external power source.

The vehicle ECU 42 cooperatively controls the battery management unit 411 together with other units in response to inputs operated by a driver or the like, thereby performing the management of the whole vehicle. Data concerning the security of the vehicle power source 41, such as a remaining capacity of the vehicle power source 41, are transferred between the battery management unit 411 and the vehicle ECU 42 via communication lines.

The vehicle according to the fifth embodiment includes the battery pack according to fourth embodiment. Hence, the vehicle can exhibit an excellent output performance.

EXAMPLES

Examples will be described below, but the embodiments are not limited to the examples described below.

Example 1

In Example 1, an electrode composite of Example 1 was produced by the following procedure.

<Production of Negative Electrode>

As an active material, there was provided a powder of $Nb_2TiO_7$ having an average secondary particle size of 10 µm and having a lithium insertion and extraction potential higher than 1.0 V with respect to the lithium redox potential. This material, acetylene black having an average particle size of 35 nm as a conductive agent, carboxyl methyl cellulose as a binder and styrene-butadiene rubber as a binder were mixed in a mass ratio of 93:5:1:1 while adding pure water, thus preparing a slurry. The obtained slurry was coated onto both surfaces of an aluminum foil having a thickness of 15 µm and an average crystal grain size of 30 µm in a coating weight of 100 g/m² per side. Then, an obtained coated film was dried. Thus, a negative electrode including the negative electrode current collector and the negative electrode active material-containing layer provided on both surfaces of the negative electrode current collector was obtained.

<Production of Insulating Particle Layer>

$Li_7La_3Zr_2O_{12}$ (average particle size: 5 µm) was provided as inorganic compound particles having lithium ion conductivity. The particles and polyvinylidene fluoride (PVdF) as a binder were mixed so that the mass ratio was 100:3 and dispersed with N-methylpyrrolidone (NMP) as a dispersion medium, whereby a first slurry was prepared.

Using a gravure coater, the first slurry was coated onto one of the negative electrode active material-containing layers of the negative electrode previously produced, and an obtained coated film was dried. Thus, a first coated film was obtained. The thickness of the first coated film after drying was 10 µm.

Further, $Li_7La_3Zr_2O_{12}$ (average particle size: 15 µm) was provided as inorganic compound particles having lithium ion conductivity. The particles and polyvinylidene fluoride (PVdF) as a binder were mixed so that the mass ratio was 100:6 and dispersed with N-methylpyrrolidone (NMP) as a dispersion medium, whereby a second slurry was prepared.

Then, the second slurry was coated onto the first coated film using a gravure coater, and the coated film was dried. Thus, a second coated film was obtained. The thickness of the second coated film after drying was 20 µm.

By repeating the same procedure as above, a first coated film was formed on the other negative electrode active material layer of the negative electrode, and a second coated film was further formed on the first coated film.

Subsequently, pressing treatment was carried out from the second coated film toward the negative electrode current collector. The pressing treatment was carried out using a roll press machine at a linear pressure of 2.0 kN/cm. Thus, the electrode composite of Example 1 was obtained. This electrode composite included the negative electrode and an insulating particle layer in contact with each negative electrode active material-containing layer. Each of the insulating particle layers had a first surface and a second surface opposed to the first surface. The first surface was in contact with each of the negative electrode active material-containing layers. The surface roughness of the second surface was 0.08 µm as measured by the method described above. The density of the negative electrode active material-containing layer was 2.6 g/cm³.

In Example 1, a nonaqueous electrolyte battery was produced using the electrode composite of Example 1 by the following procedure.

<Production of Positive Electrode>

First, a powder of lithium cobalt composite oxide ($LiCoO_2$) as a positive electrode active material, acetylene black and graphite as conductive agents, and polyvinylidene fluoride (PVdF) as a binder were provided.

90% by mass of lithium cobalt composite oxide, 3% by mass of acetylene black, 3% by mass of graphite and 4% by mass of PVdF were added to N-methylpyrrolidone (NMP) as a solvent and mixed to prepare a positive electrode slurry. This positive electrode slurry was coated onto both surfaces of a current collector formed of an aluminum foil having a thickness of 15 µm and an average crystal grain size of 30 µm. Then, an obtained coated film was dried and pressed. The pressing treatment was carried out using a roll press machine at a linear pressure of 1.5 kN/cm. Thus, a positive electrode including a positive electrode current collector and a positive electrode active material-containing layer formed on the positive electrode current collector was obtained. The density of the positive electrode active material-containing layer of the obtained positive electrode was about 3.0 g/cm³. Further, the average surface roughness Ra of the surface of the positive electrode active material-containing layer which was not in contact with the positive electrode current collector was 0.15 µm.

<Preparation of Precursor of Gel Nonaqueous Electrolyte>

Ethylene carbonate and diethyl carbonate were mixed at a volume ratio of 1:2 to prepare a liquid nonaqueous solvent. Lithium hexafluorophosphate ($LiPF_6$) as an electrolyte was dissolved in the liquid nonaqueous solvent at a concentration of 1.51 mol/L. Thus, a liquid nonaqueous electrolyte was prepared.

Then, this liquid nonaqueous electrolyte was mixed with polyacrylonitrile (PAN) monomer and stirred. At this time, the mass ratio of the liquid nonaqueous electrolyte to PAN was 2:1. Thus, a precursor of a gel nonaqueous electrolyte was prepared. This precursor was in a liquid state.

<Production of Battery>

A negative electrode lead was attached to the negative electrode current collector of the electrode composite produced as described above. Likewise, a positive electrode lead was attached to the positive electrode current collector of the positive electrode produced as described above.

Then, the electrode composite and the positive electrode were stacked. At this time, the second surface of one of the insulating particle layers of the electrode composite was in contact with one of the positive electrode active material-containing layers of the positive electrode. Thus, an electrode group was obtained. This electrode group was placed in a container formed of a laminate film.

Then, the precursor of the gel nonaqueous electrolyte previously prepared was injected into the electrode group. Then, the container housing the electrode group was placed in a vacuum chamber, and the pressure in the chamber was reduced. By this operation, the precursor of the gel nonaqueous electrolyte was held in the electrode group. Thereafter, the container was sealed.

The container was then transferred to a thermostat chamber at 65° C. Here, the container was left for 15 hours. Thus, the precursor held in the electrode group was converted into a gel nonaqueous electrolyte. In other words, a portion of the gel nonaqueous electrolyte was held in the insulating particle layer of the electrode composite.

Then, the container was placed in a chamber of a pressure reducing device and opened in the chamber. The pressure in the chamber was reduced while keeping the container open. Then, the container was sealed while maintaining the reduced pressure in the chamber. Thus, the container was vacuum-sealed. Thus, the nonaqueous electrolyte battery of Example 1 was produced.

Example 2

In Example 2, an electrode composite of Example 2 was produced by the same procedure as in Example 1 except for using inorganic compound particles $Li_7La_3Zr_2O_{12}$ having an average particle size different from that of those used in Example 1.

Specifically, in Example 2, when preparing a first slurry, $Li_7La_3Zr_2O_{12}$ having an average particle size of 8 μm was used. The mixing ratio of $Li_7La_3Zr_2O_{12}$ and PVdF was the same as in Example 1. The first slurry prepared in Example 2 was coated onto a negative electrode active material-containing layer in the same manner as in Example 1, and an obtained coated film was dried. Thus, a first coated film was obtained. The thickness of the first coated film after drying was 15 μm.

In Example 2, when preparing a second slurry, $Li_7La_3Zr_2O_{12}$ having an average particle size of 25 μm was used. The mixing ratio of $Li_7La_3Zr_2O_{12}$ and PVdF was the same as in Example 1. The second slurry prepared in Example 2 was coated onto the first coated film in the same manner as in Example 1, and an obtained coated film was dried. Thus, a second coated film was obtained. The thickness of the second coated film after drying was 35 μm.

Press treatment for obtaining an electrode composite was carried out using a roll press machine at a linear pressure of 2.0 kN/cm. By this press, the electrode composite of Example 2 was obtained. This electrode composite included a negative electrode and an insulating particle layer in contact with each negative electrode active material-containing layer. Each of the insulating particle layers had a first surface and a second surface opposed to the first surface. The first surface was in contact with each of the negative electrode active material-containing layers. The surface roughness of the second surface was 0.1 μm as measured by the method described above. The density of the negative electrode active material-containing layer was 2.6 g/cm³.

In Example 2, a nonaqueous electrolyte battery of Example 2 was produced by the same procedure as in Example 1 except for using the electrode composite of Example 2.

Example 3

In Example 3, an electrode composite of Example 3 was produced by the same procedure as in Example 1 except for using inorganic compound particles $Li_7La_3Zr_2O_{12}$ having an average particle size different from that of those used in Example 1.

Specifically, in Example 3, when preparing a first slurry, $Li_7La_3Zr_2O_{12}$ having an average particle size of 3 μm was used. The mixing ratio of $Li_7La_3Zr_2O_{12}$ and PVdF was the same as in Example 1. The first slurry prepared in Example 3 was coated onto a negative electrode active material-containing layer in the same manner as in Example 1, and an obtained coated film was dried. Thus, a first coated film was obtained. The thickness of the first coated film after drying was 20 μm.

In Example 3, when preparing a second slurry, $Li_7La_3Zr_2O_{12}$ having an average particle size of 20 μm was used. The mixing ratio of $Li_7La_3Zr_2O_{12}$ and PVdF was the same as in Example 1. The second slurry prepared in Example 3 was coated onto the first coated film in the same manner as in Example 1, and an obtained coated film was dried. Thus, a second coated film was obtained. The thickness of the second coated film after drying was 35 μm.

Press treatment for obtaining an electrode composite were carried out using a roll press machine at a linear pressure of 2.5 kN/cm. By this press, the electrode composite of Example 3 was obtained. This electrode composite included a negative electrode and an insulating particle layer in contact with each negative electrode active material-containing layer. Each of the insulating particle layers had a first surface in contact with each of the negative electrode active material-containing layers and an opposing second surface. The surface roughness of the second surface was 0.06 μm as measured by the method described above. The density of the negative electrode active material-containing layer was 2.6 g/cm³.

In Example 3, a nonaqueous electrolyte battery of Example 3 was produced by the same procedure as in Example 1 except for using the electrode composite of Example 3.

Example 4

In Example 4, a nonaqueous electrolyte battery of Example 4 was produced by the following procedure.

First, in Example 4, two electrode composites were produced by the same procedure as in Example 1.

Then, using each of the electrode composites, two electrode groups were produced by the same procedure as in Example 1.

Then, each of the electrode groups was placed in a separate container. Then, by the same procedure as in Example 1, a precursor of a gel nonaqueous electrolyte was held in the electrode group housed in each container. Then, the precursor held in the electrode group was converted into a gel nonaqueous electrolyte by the same procedure as in Example 1.

Then, the electrode groups were taken out from the container and connected in series. These electrode groups were placed in a container formed of a laminate film. Then, this container was placed in a chamber of a pressure reducing device, and here, the container was vacuum-sealed by the same procedure as in Example 1. Thus, the nonaqueous electrolyte battery of Example 4 was obtained.

Example 5

In Example 5, an electrode composite of Example 5 was produced by the same procedure as in Example 1 except for the following points.

First, in Example 5, a negative electrode including a negative electrode current collector and a negative electrode active material-containing layer formed on both surfaces of the negative electrode current collector was produced by the same procedure as in Example 1 except for using a powder of $Nb_2TiO_7$ having an average secondary particle size of 12 µm and having a lithium insertion-and-extraction potential higher than 1.0 V with respect to the lithium redox potential.

In Example 5, inorganic compound particles $Li_7La_3Zr_2O_{12}$ having an average particle size different from that of those used in Example 1 were used.

Specifically, in Example 5, when preparing a first slurry, $Li_7La_3Zr_2O_{12}$ having an average particle size of 1 µm was used. The mixing ratio of $Li_7La_3Zr_2O_{12}$ and PVdF was the same as in Example 1. The first slurry prepared in Example 5 was coated onto the negative electrode active material-containing layer in the same manner as in Example 1, and an obtained coated film was dried. Thus, a first coated film was obtained. The thickness of the first coated film after drying was 15 µm.

In Example 5, when preparing a second slurry, $Li_7La_3Zr_2O_{12}$ having an average particle size of 15 µm was used. The mixing ratio of $Li_7La_3Zr_2O_{12}$ and PVdF was the same as in Example 1. The second slurry prepared in Example 5 was coated onto the first coated film in the same manner as in Example 1, and an obtained coated film was dried. Thus, a second coated film was obtained. The thickness of the second coated film after drying was 20 µm.

The pressing treatment for obtaining an electrode composite were carried out using a roll press machine at a linear pressure of 2.3 kN/cm. By this press, the electrode composite of Example 5 was obtained. This electrode composite included a negative electrode and an insulating particle layer in contact with each negative electrode active material-containing layer. Each of the insulating particle layers had a first surface and a second surface opposed to the first surface. The first surface was in contact with each of the negative electrode active material-containing layers. The surface roughness of the second surface was 0.05 µm as measured by the method described above. The density of the negative electrode active material-containing layer was 2.63 g/cm³.

In Example 5, a nonaqueous electrolyte battery of Example 5 was produced by the same procedure as in Example 1 except for using the electrode composite of Example 5.

Example 6

In Example 6, an electrode composite of Example 6 was produced by the same procedure as in Example 1 except that the inorganic compound particles used were changed from $Li_7La_3Zr_2O_{12}$ to $Li_{1.3}Al_{0.3}Ti_{1.7}(PO_4)$.

Specifically, in Example 6, when preparing a first slurry, $Li_{1.3}Al_{0.3}Ti_{1.7}(PO_4)$ having an average particle size of 5 µm was used. The mixing ratio of $Li_{1.3}Al_{0.3}Ti_{1.7}(PO_4)$ and PVdF was the same as in Example 1. The first slurry prepared in Example 6 was coated onto the negative electrode active material-containing layer in the same manner as in Example 1, and an obtained coated film was dried. Thus, a first coated film was obtained. The thickness of the first coated film after drying was 10 µm.

In Example 6, when preparing a second slurry, $Li_{1.3}Al_{0.3}Ti_{1.7}(PO_4)$ having an average particle size of 20 µm was used. The mixing ratio of $Li_{1.3}Al_{0.3}Ti_{1.7}(PO_4)$ and PVdF was the same as in Example 1. The second slurry prepared in Example 6 was coated onto the first coated film in the same manner as in Example 1, and an obtained coated film was dried. Thus, a second coated film was obtained. The thickness of the second coated film after drying was 25 µm.

The press treatment for obtaining an electrode composite were carried out using a roll press machine at a linear pressure of 2.2 kN/cm. By this press, the electrode composite of Example 6 was obtained. This electrode composite included a negative electrode and an insulating particle layer in contact with each negative electrode active material-containing layer. Each of the insulating particle layers had a first surface and a second surface opposed to the first surface. The first surface was in contact with each of the negative electrode active material-containing layers. The surface roughness of the second surface was 0.05 µm as measured by the method described above. The density of the negative electrode active material-containing layer was 2.61 g/cm³.

In Example 6, a nonaqueous electrolyte battery of Example 6 was produced by the same procedure as in Example 1 except for using the electrode composite of Example 6.

Example 7

In Example 7, an electrode composite of Example 7 was produced by the same procedure as in Example 1 except for the following points.

First, in Example 7, a negative electrode including a negative electrode current collector and a negative electrode active material-containing layer formed on both surfaces of the negative electrode current collector was produced by the same procedure as in Example 1 except for using a powder of $Nb_2TiO_7$ having an average secondary particle size of 15 µm and having a lithium insertion-and-extraction potential higher than 1.0 V with respect to the lithium redox potential.

In Example 7, inorganic compound particles $Li_7La_3Zr_2O_{12}$ having an average particle size different from that of those used in Example 1 were used.

Specifically, in Example 7, when preparing a first slurry, $Li_7La_3Zr_2O_{12}$ having an average particle size of 1 µm was used. The mixing ratio of $Li_7La_3Zr_2O_{12}$ and PVdF was the same as in Example 1. The first slurry prepared in Example 7 was coated onto the negative electrode active material-containing layer in the same manner as in Example 1, and an obtained coated film was dried. Thus, a first coated film was obtained. The thickness of the first coated film after drying was 10 µm.

In Example 7, when preparing a second slurry, $Li_7La_3Zr_2O_{12}$ having an average particle size of 20 µm was used. The mixing ratio of $Li_7La_3Zr_2O_{12}$ and PVdF was the same as in Example 1. The second slurry prepared in Example 7 was coated onto the first coated film in the same manner as in Example 1, and an obtained coated film was dried. Thus, a second coated film was obtained. The thickness of the second coated film after drying was 30 μm.

The press treatment for obtaining an electrode composite were carried out using a roll press machine at a linear pressure of 2.0 kN/cm. By this press, the electrode composite of Example 7 was obtained. This electrode composite included a negative electrode and an insulating particle layer in contact with each negative electrode active material-containing layer. Each of the insulating particle layers had a first surface and a second surface opposed to the first surface. The first surface was in contact with each of the negative electrode active material-containing layers. The surface roughness of the second surface was 0.07 μm as measured by the method described above. The density of the negative electrode active material-containing layer was 2.6 g/cm$^3$.

In Example 7, a nonaqueous electrolyte battery of Example 7 was produced by the same procedure as in Example 1 except for using the electrode composite of Example 7.

Comparative Example 1

In Comparative Example 1, an electrode composite of Comparative Example 1 was produced by the same procedure as in Example 1 except for using inorganic compound particles $Li_7La_3Zr_2O_{12}$ having an average particle size different from that of those used in Example 1.

Specifically, in Comparative Example 1, when preparing a first slurry, $Li_7La_3Zr_2O_{12}$ having an average particle size of 1 μm was used. The mixing ratio of $Li_7La_3Zr_2O_{12}$ and PVdF was the same as in Example 1. The first slurry prepared in Comparative Example 1 was coated onto a negative electrode active material-containing layer in the same manner as in Example 1, and an obtained coated film was dried. Thus, a first coated film was obtained. The thickness of the first coated film after drying was 5 μm.

In Comparative Example 1, when preparing a second slurry, $Li_7La_3Zr_2O_{12}$ having an average particle size of 50 μm was used. The mixing ratio of $Li_7La_3Zr_2O_{12}$ and PVdF was the same as in Example 1. The second slurry prepared in Comparative Example 1 was coated onto the first coated film in the same manner as in Example 1, thus obtaining a second coated film. The thickness of the second coated film was 80 μm.

Pressing for obtaining an electrode composite was carried out using a roll press machine at a linear pressure of 2.0 kN/cm. By this press, the electrode composite of Comparative Example 1 was obtained. This electrode composite included a negative electrode and an insulating particle layer in contact with each negative electrode active material-containing layer. Each of the insulating particle layers had a first surface and a second surface opposed to the first surface. The first surface was in contact with each of the negative electrode active material-containing layers. The surface roughness of the second surface was 0.5 μm as measured by the method described above. The density of the negative electrode active material-containing layer was 2.6 g/cm$^3$.

In Comparative Example 1, a nonaqueous electrolyte battery of Comparative Example 1 was produced by the same procedure as in Example 1 except for using the electrode composite of Comparative Example 1.

Comparative Example 2

In Comparative Example 2, an electrode composite of Comparative Example 2 was produced by the same procedure as in Example 1 except that only a first slurry was coated to produce an insulating particle layer. That is, in Comparative Example 2, a second slurry was not used.

In Comparative Example 2, the thickness of a first coated film after drying was 30 μm.

Pressing for obtaining an electrode composite was carried out using a roll press machine at a linear pressure of 2.0 kN/cm. By this press, the electrode composite of Comparative Example 2 was obtained. This electrode composite included a negative electrode and an insulating particle layer in contact with each negative electrode active material-containing layer. Each of the insulating particle layers had a first surface and a second surface opposed to the first surface. The first surface was in contact with each of the negative electrode active material-containing layers. The surface roughness of the second surface was 0.12 μm as measured by the method described above. The density of the negative electrode active material-containing layer was 2.6 g/cm$^3$.

In Comparative Example 2, a nonaqueous electrolyte battery of Comparative Example 2 was produced by the same procedure as in Example 1 except for using the electrode composite of Comparative Example 2.

Comparative Example 3

In Comparative Example 3, an electrode composite of Comparative Example 3 was produced by the same procedure as in Example 1 except for the following points.

First, in Comparative Example 3, a negative electrode including a negative electrode current collector and a negative electrode active material-containing layer formed on both the surfaces of the negative electrode current collector was produced by the same procedure as in Example 5.

In Comparative Example 3, inorganic compound particles $Li_7La_3Zr_2O_{12}$ having an average particle size different from that of those used in Example 1 were used.

Specifically, in Comparative Example 3, when preparing a first slurry, $Li_7La_3Zr_2O_{12}$ having an average particle size of 1 μm was used. The mixing ratio of $Li_7La_3Zr_2O_{12}$ and PVdF was the same as in Example 1. The first slurry prepared in Comparative Example 3 was coated onto the negative electrode active material-containing layer in the same manner as in Example 1, and an obtained coated film was dried. Thus, a first coated film was obtained. The thickness of the first coated film after drying was 10 μm.

In Comparative Example 3, when preparing a second slurry, $Li_7La_3Zr_2O_{12}$ having an average particle size of 15 μm was used. The mixing ratio of $Li_7La_3Zr_2O_{12}$ and PVdF was the same as in Example 1. The second slurry prepared in Comparative Example 3 was coated onto the first coated film in the same manner as in Example 1, and an obtained coated film was dried. Thus, a second coated film was obtained. The thickness of the second coated film after drying was 60 μm.

The press treatment for obtaining an electrode composite were carried out using a roll press machine at a linear pressure of 2.0 kN/cm. By this press, the electrode composite of Comparative Example 3 was obtained. This electrode composite included a negative electrode and an insulating particle layer in contact with each negative electrode active material-containing layer. Each of the insulating particle layers had a first surface and a second surface opposed to the first surface. The first surface was in contact with each of the negative electrode active material-containing layers. The surface roughness of the second surface was 0.2 μm as measured by the method described above. The density of the negative electrode active material-containing layer was 2.6 g/cm$^3$.

In Comparative Example 3, a nonaqueous electrolyte battery of Comparative Example 3 was produced by the same procedure as in Example 1 except for using the electrode composite of Comparative Example 3.

Comparative Example 4

In Comparative Example 4, an electrode composite of Comparative Example 3 was produced by the same procedure as in Example 1 except for the following points.

First, in Comparative Example 4, a negative electrode including a negative electrode current collector and a negative electrode active material-containing layer formed on both the surfaces of the negative electrode current collector was produced by the same procedure as in Example 5.

In Comparative Example 4, inorganic compound particles Li$_7$La$_3$Zr$_2$O$_{12}$ having an average particle size different from that of those used in Example 1 were used.

Specifically, in Comparative Example 4, when preparing a first slurry, Li$_7$La$_3$Zr$_2$O$_{12}$ having an average particle size of 5 μm was used. The mixing ratio of Li$_7$La$_3$Zr$_2$O$_{12}$ and PVdF was the same as in Example 1. The first slurry prepared in Comparative Example 4 was coated onto the negative electrode active material-containing layer in the same manner as in Example 1, and an obtained coated film was dried. Thus, a first coated film was obtained. The thickness of the first coated film after drying was 10 μm.

In Comparative Example 4, when preparing a second slurry, Li$_7$La$_3$Zr$_2$O$_{12}$ having an average particle size of 50 μm was used. The mixing ratio of Li$_7$La$_3$Zr$_2$O$_{12}$ and PVdF was the same as in Example 1. The second slurry prepared in Comparative Example 4 was coated onto the first coated film in the same manner as in Example 1, and an obtained coated film was dried. Thus, a second coated film was obtained. The thickness of the second coated film after drying was 70 μm.

The press treatment for obtaining an electrode composite were carried out using a roll press machine at a linear pressure of 1.3 kN/cm. By this press, the electrode composite of Comparative Example 4 was obtained. This electrode composite included a negative electrode and an insulating particle layer in contact with each negative electrode active material-containing layer. Each of the insulating particle layers had a first surface and a second surface opposed to the first surface. The first surface was in contact with each of the negative electrode active material-containing layers. The surface roughness of the second surface was 0.35 μm as measured by the method described above. The density of the negative electrode active material-containing layer was 2.35 g/cm$^3$.

In Comparative Example 4, a nonaqueous electrolyte battery of Comparative Example 4 was produced by the same procedure as in Example 1 except for using the electrode composite of Comparative Example 4.

Comparative Example 5

In Comparative Example 5, an electrode composite of Comparative Example 3 was produced by the same procedure as in Example 1 except for the following points.

First, in Comparative Example 5, a negative electrode including a negative electrode current collector and a negative electrode active material-containing layer formed on both the surfaces of the negative electrode current collector was produced by the same procedure as in Example 5.

In Comparative Example 5, inorganic compound particles Li$_7$La$_3$Zr$_2$O$_{12}$ having an average particle size different from that of those used in Example 1 were used.

Specifically, in Comparative Example 5, when preparing a first slurry, Li$_7$La$_3$Zr$_2$O$_{12}$ having an average particle size of 15 μm was used. The mixing ratio of Li$_7$La$_3$Zr$_2$O$_{12}$ and PVdF was the same as in Example 1. The first slurry prepared in Comparative Example 5 was coated onto the negative electrode active material-containing layer in the same manner as in Example 1, and an obtained coated film was dried. Thus, a first coated film was obtained. The thickness of the first coated film after drying was 20 μm.

In Comparative Example 5, when preparing a second slurry, Li$_7$La$_3$Zr$_2$O$_{12}$ having an average particle size of 15 μm was used. The mixing ratio of Li$_7$La$_3$Zr$_2$O$_{12}$ and PVdF was the same as in Example 1. The second slurry prepared in Comparative Example 5 was coated onto the first coated film in the same manner as in Example 1, and an obtained coated film was dried. Thus, a second coated film was obtained. The thickness of the second coated film after drying was 20 μm.

The press treatment for obtaining an electrode composite were carried out using a roll press machine at a linear pressure of 1.6 kN/cm. By this press, the electrode composite of Comparative Example 5 was obtained. This electrode composite included a negative electrode and an insulating particle layer in contact with each negative electrode active material-containing layer. Each of the insulating particle layers had a first surface and a second surface opposed to the first surface. The first surface was in contact with each of the negative electrode active material-containing layers. The surface roughness of the second surface was 0.25 μm as measured by the method described above. The density of the negative electrode active material-containing layer was 2.5 g/cm$^3$.

In Comparative Example 5, a nonaqueous electrolyte battery of Comparative Example 5 was produced by the same procedure as in Example 1 except for using the electrode composite of Comparative Example 5.

<Test>

The nonaqueous electrolyte batteries produced as described above were subjected to the following test.

Hereinafter, the battery to be tested is merely described as "battery", but each of the nonaqueous electrolyte batteries of the example and the comparative example was tested in the same manner by the following procedure.

The battery was charged at a constant current of 0.2 C under a 25° C. environment until the voltage reached 2.8 V. Then, the battery was subjected to charging at a constant voltage of 2.8 V until the total charging time reached 10 hours. Thereafter, the battery was subjected to discharging at a constant current of 0.2 C until the voltage reached 1.5 V. The discharge capacity under the constant current discharge was taken as a capacity A [Ah].

Then, the battery was charged at a constant current of 1 C until the voltage reached 2.8 V. Then, the battery was subjected to charging at a constant voltage of 2.8 V until the total charging time reached 3 hours. Then, the battery was subjected to discharging at a constant current of 3 C until the voltage reached 1.5 V. The discharge capacity under the constant current discharge was taken as a capacity B [Ah].

[Result]

With respect to Examples 1 to 7 and Comparative Examples 1 to 5, the average particle size of the negative electrode active material secondary particles, the surface roughness Ra of the second surface of the insulating particle layer, and the capacities A and B measured in the above-test are shown in Table 1 below. Should be noted that the capacity A of each battery is shown as a relative value with the capacity A of the nonaqueous electrolyte battery of Example 1 defined as 100. The capacity B of each battery is also shown as a relative value with the capacity B of the nonaqueous electrolyte battery of Example 1 taken defined 100.

TABLE 1

|  | Average Particle Size of Negative Electrode Active Material Particles ($\mu m$) | Surface Roughness Ra of Second Surface ($\mu m$) | Discharge Capacity A at 0.2 C (relative value) | Discharge Capacity B at 3 C (relative value) |
| --- | --- | --- | --- | --- |
| Example 1 | 10 | 0.08 | 100 | 100 |
| Example 2 | 10 | 0.1 | 100 | 98 |
| Example 3 | 10 | 0.06 | 99 | 96 |
| Example 4 | 10 | 0.08 | 101 | 99 |
| Example 5 | 12 | 0.05 | 100 | 99 |
| Example 6 | 10 | 0.05 | 100 | 99 |
| Example 7 | 15 | 0.07 | 100 | 97 |
| Comparative Example 1 | 10 | 0.5 | 98 | 60 |
| Comparative Example 2 | 10 | 0.12 | 70 | 20 |
| Comparative Example 3 | 12 | 0.2 | 98 | 65 |
| Comparative Example 4 | 12 | 0.35 | 98 | 75 |
| Comparative Example 5 | 12 | 0.25 | 88 | 65 |

From the results shown in Table 1, it is found that the discharge capacity A at 0.2 C of each of the batteries of Examples 1 to 7 was larger than that of each of the batteries of Comparative Examples 2 and 5. Also, it is found that the discharge capacity B at 3 C of each of the batteries of Examples 1 to 7 was larger than that of each of the batteries of Comparative Examples 1 to 5.

From these results, it is understood that the batteries of Examples 1 to 7 were able to exhibit more excellent output performance than the batteries of Comparative Examples 1 to 5.

When the batteries after the test were examined in detail, it was found that the resistance values of the batteries of Comparative Examples 1, 3 and 4 were twice or more those of the batteries of Examples 1 to 7. This is considered to be one of the reasons why the discharge capacities B at 3 C of the batteries of Comparative Examples 1, 3 and 4 were lower than those of the batteries of Examples 1 to 7.

When the batteries of Comparative Examples 2 and 5 were examined after the test, it was found that an electrical short circuit partially occurred between the positive electrode and the negative electrode. Thus, it can be considered that the batteries of Comparative Examples 2 and 5 were not able to be smoothly charged and discharged. This is considered to be one of the reasons why the discharge capacity A at 0.2 C and the discharge capacity B at 3 C of each of the batteries of Comparative Examples 2 and 5 were lower than those of the batteries of Examples 1 to 7.

According to at least one embodiments and examples described above, an electrode composite is provided. This electrode composite includes a negative electrode active material-containing layer and an insulating particle layer. The negative electrode active material-containing layer includes negative electrode active material secondary particles. The average secondary particle size of the negative electrode active material secondary particles is from 1 $\mu m$ to 30 $\mu m$. The insulating particle layer includes inorganic compound particles. The insulating particle layer is provided on the negative electrode active material-containing layer. The insulating particle layer has a first surface and a second surface opposed to the first surface. The first surface is in contact with the negative electrode active material-containing layer. The surface roughness of the second surface of the insulating particle layer is 0.1 $\mu m$ or less. When this electrode composite is used in a secondary battery, an electrical short circuit between the negative electrode active material-containing layer and the positive electrode and side reactions of the negative electrode active material secondary particles with the electrolyte can be suppressed. As a result, the electrode composite can realize a secondary battery that can exhibit an excellent output performance.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electrode composite comprising:
   a negative electrode active material-containing layer comprising negative electrode active material secondary particles having an average secondary particle size of from 1 $\mu m$ to 30 $\mu m$; and
   an insulating particle layer provided on the negative electrode active material-containing layer and comprising inorganic compound particles,
   wherein the insulating particle layer comprises a first surface and a second surface opposed to the first surface, the first surface is in contact with the negative electrode active material-containing layer, and the second surface has a surface roughness of 0.1 $\mu m$ or less.

2. The electrode composite according to claim 1, wherein a thickness of the insulating particle layer is from 10 $\mu m$ to 40 $\mu m$.

3. The electrode composite according to claim 1, wherein the inorganic compound particles comprise lithium ion-conductive particles.

4. The electrode composite according to claim 1, wherein the negative electrode active material secondary particles comprise titanium-containing oxide particles.

5. The electrode composite according to claim 4, wherein the titanium-containing oxide particles comprise at least one kind of particles selected from the group consisting of particles of a lithium titanate having a spinel-type crystal structure, particles of a lithium titanate having a ramsdellite-type crystal structure, particles of a titanium-niobium composite oxide, particles of a titanium dioxide having a monoclinic crystal structure, and particles of a titanium dioxide having an anatase-type crystal structure.

6. The electrode composite according to claim 1, further comprising:
   a current collector comprising a third surface and a fourth surface opposed to the third surface, the negative electrode active material-containing layer being provided on the third surface; and a positive electrode active material-containing layer provided on the fourth surface.

7. A secondary battery comprising:

the electrode composite according to claim 1; and a positive electrode comprising a positive electrode active material-containing layer, wherein the second surface of the insulating particle layer is in contact with the positive electrode active material-containing layer.

8. A secondary battery comprising a first electrode composite and a second electrode composite located next to the first electrode composite, the first and the second electrode composites being composite electrodes each according to claim 6, wherein the second surface of the insulating particle layer of the first electrode composite is in contact with the positive electrode active material-containing layer of the second electrode composite.

9. The secondary battery according to claim 7, further comprising a gel nonaqueous electrolyte held in the insulating particle layer.

10. A battery pack comprising the secondary battery according to claim 7.

11. The battery pack according to claim 10, further comprising:

an external power distribution terminal; and a protective circuit.

12. The battery pack according to claim 10, comprising a plural of secondary batteries, the plural of the secondary batteries being electrically connected in series, in parallel, or in combination of in series and in parallel.

13. A vehicle comprising the battery pack according to claim 10.

14. The vehicle according to claim 13, which comprises a mechanism configured to convert kinetic energy of the vehicle into regenerative energy.

* * * * *